(12) United States Patent
Kihm

(10) Patent No.: US 12,517,941 B1
(45) Date of Patent: Jan. 6, 2026

(54) RETRIEVAL-AUGMENTED GENERATION FOR LARGE LANGUAGE MODELS

(71) Applicant: POMA AI GmbH, Berlin (DE)

(72) Inventor: Alexander Kihm, Berlin (DE)

(73) Assignee: POMA AI GMBH, Berlin (DE)

( * ) Notice: Subject to any disclaimer, the term of this patent is extended or adjusted under 35 U.S.C. 154(b) by 0 days.

(21) Appl. No.: 19/170,097

(22) Filed: Apr. 4, 2025

(51) Int. Cl.
*G06F 16/35* (2025.01)

(52) U.S. Cl.
CPC .................................. *G06F 16/35* (2019.01)

(58) Field of Classification Search
None
See application file for complete search history.

(56) References Cited

U.S. PATENT DOCUMENTS

| | | | |
|---|---|---|---|
| 11,861,321 B1* | 1/2024 | O'Kelly | G06F 16/33 |
| 12,242,468 B1* | 3/2025 | Brenner | G06F 16/24578 |
| 2018/0373952 A1* | 12/2018 | Bui | G06V 30/153 |
| 2022/0130163 A1* | 4/2022 | Kumar | G06F 16/93 |
| 2022/0222489 A1* | 7/2022 | Liu | G06F 18/214 |
| 2024/0028909 A1* | 1/2024 | Wang | G06N 5/041 |
| 2024/0289561 A1* | 8/2024 | Qadrud-Din | G06F 40/226 |
| 2024/0419904 A1* | 12/2024 | Wu | G06N 3/045 |

* cited by examiner

*Primary Examiner* — Loan T Nguyen
(74) *Attorney, Agent, or Firm* — Blueshift IP; Robert Plotkin

(57) ABSTRACT

A document preparation method involves creating a hierarchical representation of an input document without summarizing or omitting any content. The method uses a generative language model to generate the hierarchical representation and stores it in a repository for later use by a client generative language model. This allows for more accurate and complete generation of text, enabling the use of retrieval units to enhance the output of the client generative language model while efficiently exploiting its limited context window.

17 Claims, 12 Drawing Sheets

Llei 24/2014, del 30 d'octubre, de plaques de matrícula personalitzada de vehicles ⌒ 802

Atès que el Consell General en la seva sessió del dia 30 d'octubre del 2014 ha aprovat la següent:

llei 24/2014, del 30 d'octubre, de plaques de matrícula personalitzada de vehicles Exposició de motius ⌒ 802

Les plaques de matrícula en els vehicles tenen la funció d'identificar i individualitzar cada vehicle respecte als altres, amb una representació que acostuma a ser una combinació de caràcters alfanumèrics. Però ahora, la multiplicitat de formats, colors, símbols i anagrames ha fet que les plaques de matrícula siguin també una identificació del país emissor i una forma d'exportar la marca del país quan els vehicles circulen a l'estranger. La placa de matrícula és, doncs, un símbol propi dels estats sobirans.

A Andorra, les matrícules han evolucionat d'acord amb la imatge que des de l'Administració s'ha volgut donar a aquest identificatiu, i també per adaptar-se a l'evolució del parc automobilístic del país, que té una ràtio que s'apropa a un vehicle per habitant.

L'Ordinació del Consell General del 13 de maig de 1929 obligava a declarar tots els vehicles matriculats i per matricular. Al llarg d'aquests 85 anys, les plaques de matrícula han evolucionat en la forma i en el fons. Actualment, a banda de la placa de matrícula ordinària existeixen altres models de placa de matrícula en funció de les característiques i de l'ús dels vehicles, com les matrícules de ciclomotors, les temporals, les de vehicles de museus, les matrícules del cos diplomàtic, de caps de missió diplomàtica, d'administratius i de tècnics d'ambaixades i cos consular, les matrícules de "PROVA", les de motos de neu, les de vehicles especials i les de ginys mecànics.

Fora de les nostres fronteres, cada país ha confeccionat els seus propis models de matrícula i la seva codificació. La Unió Europea ha homogeneïtzat les seves matrícules ordinàries, si bé existeixen en alguns països matrícules amb un grau de personalització més o menys elevat, com per exemple al Regne Unit i recentment a Bèlgica. Més enllà d'Europa, altres països com els Estats Units, Canadà o els Emirats Àrabs Units són també coneguts per aquesta pràctica.

...

La quota tributària d'aquesta taxa es determina segons els criteris següents:

Combinacions    Quota
a) 2 lletres i 3 xifres    300 euros
b) 3 lletres i 2 xifres    500 euros
c) 4 lletres i 1 xifra    1.000 euros     ⌒ 804
d) 5 lletres    3.000 euros
e) Menys de 5 caràcters    6.000 euros Article 27

Meritació i pagament

1. La taxa es merita en el moment que el ministeri competent emet la resolució favorable d'atribució.

2. El pagament de la taxa s'ha de fer efectiu en el moment de recollir la resolució favorable d'atribució al Servei de Tràmits del Govern, que lliura la liquidació corresponent.

Capítol setè. Taxa de tinença anual de placa de matrícula personalitzada

FIG. 8

```
---------------------------
Chunk 1 (956 tokens)
---------------------------

Exposició de motius
Les plaques de matrícula en els vehicles tenen la funció d'identificar i individualitzar cada vehicle
respecte als altres, amb una representació que acostuma a ser una combinació de caràcters alfanumèrics. Però
alhora, la multiplicitat de formats, colors, símbols i anagrames ha fet que les plaques de matrícula siguin
també una identificació del país emissor i una forma d'exportar la marca del país quan els vehicles circulen
a l'estranger. La placa de matrícula és, doncs, un símbol propi dels estats sobirans.
A Andorra, les matrícules han evolucionat d'acord amb la imatge que des de l'Administració s'ha volgut donar
a aquest identificatiu, i també per adaptar-se a l'evolució del parc automobilístic del país, que té una
ràtio que s'apropa a un vehicle per habitant.
L'Ordinació del Consell General del 13 de maig de 1929 obligava a declarar tots els vehicles matriculats i
per matricular. Al llarg d'aquests 85 anys, les plaques de matrícula han evolucionat en la forma i en el
fons. Actualment, a banda de la placa de matrícula ordinària existeixen altres models de placa de matrícula
en funció de les característiques i de l'ús dels vehicles, com les matrícules de ciclomotors, les temporals,
les de vehicles de museus, les matrícules del cos diplomàtic, de caps de missió diplomàtica,
d'administratius i de tècnics d'ambaixades i cos consular, les matrícules de "PROVA", les de motos de neu,
les de vehicles especials i les de ginys mecànics.
Fora de les nostres fronteres, cada país ha confeccionat els seus propis models de matrícula i la seva
codificació. La Unió Europea ha homogeneïtzat les seves matrícules ordinàries, si bé existeixen en alguns
països matrícules amb un grau de personalització més o menys elevat, com per exemple al Regne Unit i
recentment a Bèlgica. Més enllà d'Europa, altres països com els Estats Units, Canadà o els Emirats Àrabs
Units són també coneguts per aquesta pràctica.
Així doncs, la matrícula personalitzada és una forma diferent d'identificació del país, però també és una
eina de recaptació, ateses les taxes derivades de la seva adquisició.
L'objecte de la Llei és regular l'adquisició de plaques de matrícula personalitzada per crear un nou servei
públic que doni satisfacció a una demanda determinada de la societat.
La personalització consisteix en poder escollir les lletres i les xifres que componen la combinació de la
matrícula, amb un mínim de dos caràcters i fins a un màxim de cinc, d'acord amb unes regles establertes i
mantenint el disseny de la matrícula ordinària.
Amb l'adquisició d'una matrícula personalitzada, amb reserva prèvia i autorització del Govern, es confereix
al seu titular la possibilitat de mantenir la propietat d'aquesta matrícula sense poder, però,
comercialitzar-hi, vendre-la, cedir-la o donar-la, i havent-la de retornar en cas de baixa. El procediment
de reserva previst és senzill i àgil, i els terminis de reserva i atribució de la matrícula personalitzada
s'acoten a un mes per tràmit.

```
---------------------------
Chunk 2 (277 tokens)
---------------------------

Article 7
e) No s'accepten combinacions que dificultin diferenciar entre les lletres i les xifres o que prestin
confusió entre elles.
f) No s'accepten combinacions que continguin la menció "AND" i altres pròpies de l'Estat o dels poders
públics andorrans.
g) La matrícula ha de tenir un mínim de 2 caràcters i un màxim de 5 caràcters.
h) La matrícula de 5 caràcters ha de tenir un mínim de 2 lletres.
i) La matrícula no pot tenir únicament les combinacions de les lletres, "MT", "CD", "CMD", "A", "CC",
seguides de xifres o la paraula "PROVA".
j) No s'accepten combinacions reservades o atribuïdes prèviament.
Les altres característiques de la placa, fons, color, aplicació d'imatges, llegendes o d'altres no
especificades en aquesta Llei són les previstes en la normativa vigent.

```
---------------------------
Chunk 3 (124 tokens)
---------------------------

Article 26
Quota tributària
La quota tributària d'aquesta taxa es determina segons els criteris següents:
Combinacions      Quota
a) 2 lletres i 3 xifres   300 euros
b) 3 lletres i 2 xifres   500 euros
c) 4 lletres i 1 xifra   1.000 euros
d) 5 lletres        3.000 euros
e) Menys de 5 caràcters  6.000 euros

```
Chunk 4 (40 tokens)
```
Quota tributària
La quota tributària de la taxa de reserva de placa de matrícula personalitzada és un import fix de 40,74 euros.

FIG. 9D

```
Chunk 5 (95 tokens)
```
Article 2
Sol·licitants
Poden sol·licitar la reserva i l'atribució d'una placa de matrícula personalitzada:
a) Les persones físiques legalment residents a Andorra.
b) Les societats de dret andorrà.
c) Les entitats sense ànim de lucre legalment establertes a Andorra i inscrites als registres corresponents.

FIG. 9E

```
Chunk 6 (50 tokens)
```
Article 30
Quota tributària
La quota tributària corresponent a la taxa de tinença anual de placa de matrícula personalitzada és un import fix anual de 200 euros.

FIG. 9F

```
# Llei 24/2014, del 30 d'octubre, de plaques de matrícula personalitzada de vehicles
    Atès que el Consell General en la seva sessió del dia 30 d'octubre del 2014 ha aprovat la següent:
        Llei 24/2014, del 30 d'octubre, de plaques de matrícula personalitzada de vehicles
            ## Exposició de motius
                Les plaques de matrícula en els vehicles tenen la funció d'identificar i
individualitzar cada vehicle respecte als altres, amb una representació que acostuma a ser una combinació
de caràcters alfanumèrics.
                Però alhora, la multiplicitat de formats, colors, símbols i anagrames ha
fet que les plaques de matrícula siguin també una identificació del país emissor i una forma d'exportar la
marca del país quan els vehicles circulen a l'estranger.
                La placa de matrícula és, doncs, un símbol propi dels estats sobirans.
                A Andorra, les matrícules han evolucionat d'acord amb la imatge que des de
l'Administració s'ha volgut donar a aquest identificatiu, i també per adaptar-se a l'evolució del parc
automobilístic del país, que té una ràtio que s'apropa a un vehicle per habitant.
                L'Ordinació del Consell General del 13 de maig de 1929 obligava a declarar
tots els vehicles matriculats i per matricular.
                Al llarg d'aquests 85 anys, les plaques de matrícula han evolucionat en la
forma i en el fons.
                Actualment, a banda de la placa de matrícula ordinària existeixen altres
models de placa de matrícula en funció de les característiques i de l'ús dels vehicles, com les matrícules
de ciclomotors, les temporals, les de vehicles de museus, les matrícules del cos diplomàtic, de caps de
missió diplomàtica, d'administratius i de tècnics d'ambaixades i cos consular, les matrícules de "PROVA",
les de motos de neu, les de vehicles especials i les de ginys mecànics.
                Fora de les nostres fronteres, cada país ha confeccionat els seus propis
models de matrícula i la seva codificació.
                La Unió Europea ha homogeneïtzat les seves matrícules ordinàries, si bé
existeixen en alguns països matrícules amb un grau de personalització més o menys elevat, com per exemple
al Regne Unit i recentment a Bèlgica.
                Més enllà d'Europa, altres països com els Estats Units, Canadà o els
Emirats Àrabs Units són també coneguts per aquesta pràctica.

...

Article 26
                #### Quota tributària
                    La quota tributària d'aquesta taxa es determina segons els
criteris següents:
                        Combinacions
                            a) 2 lletres i 3 xifres
                                300 euros
                            b) 3 lletres i 2 xifres
                                500 euros
                            c) 4 lletres i 1 xifra
                                1.000 euros
                            d) 5 lletres
                                3.000 euros
                            e) Menys de 5 caràcters
                                6.000 euros
            ### Article 27
                #### Meritació i pagament
                    1. La taxa es merita en el moment que el ministeri
competent emet la resolució favorable d'atribució.
                    2. El pagament de la taxa s'ha de fer efectiu en el moment
de recollir la resolució favorable d'atribució al Servei de Tràmits del Govern, que lliura la liquidació
corresponent.
        ## Capítol setè. Taxa de tinença anual de placa de matrícula personalitzada
```

FIG. 10

```
------------------------------
Chunkset 1 (185 tokens) - NOT directly used as context
--------------------------------------------------------------------------------

Atès que el Consell General en la seva sessió del dia 30 d'octubre del 2014 ha aprovat la següent:
llei 24/2014, del 30 d'octubre, de plaques de matrícula personalitzada de vehicles
[...]
Capítol quart. Infraccions i sancions
[...]
Article 26
Quota tributària
Combinacions
a) 2 lletres i 3 xifres: 300 euros
b) 3 lletres i 2 xifres: 500 euros
c) 4 lletres i 1 xifra: 1.000 euros
d) 5 lletres: 3.000 euros
e) Menys de 5 caràcters: 6.000 euros
--------------------------------------------------------------------------------
```

FIG. 11A

```
------------------------------
Chunkset 2 (144 tokens) - NOT directly used as context
--------------------------------------------------------------------------------

Atès que el Consell General en la seva sessió del dia 30 d'octubre del 2014 ha aprovat la següent:
llei 24/2014, del 30 d'octubre, de plaques de matrícula personalitzada de vehicles
[...]
Capítol setè. Taxa de tinença anual de placa de matrícula personalitzada
[...]
Article 30
Quota tributària
La quota tributària corresponent a la taxa de tinença anual de placa de matrícula personalitzada és un
import fix anual de 200 euros.
--------------------------------------------------------------------------------
```

FIG. 11B

```
------------------------------
Chunkset 3 (135 tokens) - NOT directly used as context
--------------------------------------------------------------------------------

Atès que el Consell General en la seva sessió del dia 30 d'octubre del 2014 ha aprovat la següent:
llei 24/2014, del 30 d'octubre, de plaques de matrícula personalitzada de vehicles
[...]
Capítol cinquè. Taxa de reserva de placa de matrícula personalitzada
[...]
Article 21
Quota tributària
La quota tributària de la taxa de reserva de placa de matrícula personalitzada és un import fix de 40,74
euros.
--------------------------------------------------------------------------------
```

FIG. 11C

```
Cheatsheet (337 tokens) = total context, actually used
```

Atès que el Consell General en la seva sessió del dia 30 d'octubre del 2014 ha aprovat la següent:
llei 24/2014, del 30 d'octubre, de plaques de matrícula personalitzada de vehicles
[...]
Capítol quart. Infraccions i sancions
[...]
Article 26
Quota tributària
Combinacions
a) 2 lletres i 3 xifres: 300 euros
b) 3 lletres i 2 xifres: 500 euros
c) 4 lletres i 1 xifra: 1.000 euros
d) 5 lletres: 3.000 euros
e) Menys de 5 caràcters: 6.000 euros
[...]
Capítol cinquè. Taxa de reserva de placa de matrícula personalitzada
[...]
Article 21
Quota tributària
La quota tributària de la taxa de reserva de placa de matrícula personalitzada és un import fix de 40,74 euros.
[...]
Capítol setè. Taxa de tinença anual de placa de matrícula personalitzada
[...]
Article 30
Quota tributària
La quota tributària corresponent a la taxa de tinença anual de placa de matrícula personalitzada és un import fix anual de 200 euros.

FIG. 12

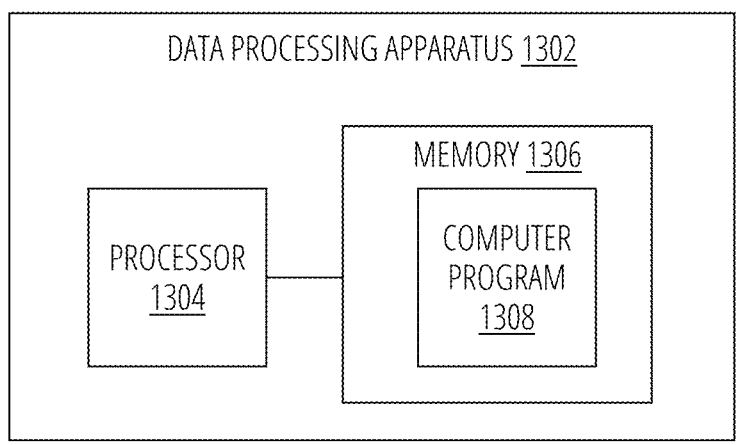

FIG. 13

RETRIEVAL-AUGMENTED GENERATION FOR LARGE LANGUAGE MODELS

TECHNICAL FIELD

This disclosure relates to the field of information processing for large language models and, more specifically, to retrieval-augmented generation systems.

BACKGROUND

Large language models (LLMs) have emerged as powerful tools for information processing and generation. These models, trained on vast corpora of text, can understand and generate human-like text across diverse domains. As organizations seek to leverage LLMs for specific applications, retrieval-augmented generation (RAG) has become an important approach for grounding LLM outputs in reliable information sources.

However, large language models are fundamentally constrained by a limited context window. This limitation imposes a hard ceiling on the amount of data an LLM can directly process, rendering the ingestion of large documents or datasets impossible without truncation or information. Critically, the number of tokens within the context window has a direct impact on computational load, leading to an increase in processing power and energy consumption as context size grows. This creates a difficult trade-off: broader context demands exorbitant computational resources, effectively limiting practical application. The sheer volume of data in modern documents pushes against these constraints, making efficient processing an often-insurmountable challenge.

To address these processing limitations, various approaches for breaking down documents into smaller units, called "chunks" that can be embedded, stored, and later retrieved as needed have been developed. However, traditional chunking methods often rely on simplistic length-based splits or static rules, which may disrupt semantic coherence or omit contextual structure. Recent approaches have explored somewhat more adaptive chunking techniques, such as using recursive splitting on separators, semantic segmentation via embeddings, or even letting an LLM decide chunk boundaries.

For example, a community discussion (see https://community.openai.com/t/using-gpt-4-api-to-semantically-chunk-documents/715689) has proposed prompting GPT-4 to analyze a document and produce a semantically separated section-wise outline of its content and then using that outline to extract text segments. In the discussion thread, a user describes prompting GPT-4 to produce a "hierarchal" (sic) outline and suggests using the outline to guide chunk extraction. However, it remains unclear in the discussion threat how these broad ideas could be put into practice.

As another example, zChunk uses a Llama-70B model to insert special delimiter tokens (a custom token like "E") into text to mark semantic chunk boundaries. Essentially, it asks the model to copy the document and sprinkle in break markers at logical points. However, zChunk produces a flat list of chunks with limited expressiveness.

Additionally, most existing chunking techniques lose the original formatting or full detail of the source. Approaches like hierarchical summarization (as in RAPTOR; Recursive Abstractive Processing for Tree-Organized Retrieval) construct multi-level summaries of document clusters, which may help with long-range context but inherently discard details due to abstraction. While summarization can capture the gist of a source, it is unsuitable when exact recall of facts or wording is required (such as for legal texts, technical documentation, and the like). Frameworks that build hierarchies tend to use either compressed representations at each level or exogenous domain knowledge. For instance, the RAPTOR system explicitly forms a tree of content, but each node is an abstractive summary of underlying text. This means RAPTOR and similar methods lose critical specifics, making them inadequate for scenarios where absolute fidelity is needed.

There is a need for a lossless chunking technique that preserves all information from the source in a structured form, so that an LLM's answers can directly quote or reference the original text when needed, ensuring accuracy and fidelity.

Beyond text, modern information systems increasingly deal with multimodal content including tables, images, diagrams, code snippets, and the like. These elements present unique processing challenges. Conventional RAG systems primarily handle unstructured text. If non-textual elements (e.g., a complex table or an explanatory diagram) are present, these are either omitted or processed in separate siloed pipelines (e.g., images via vision models, tables via simplistic CSV serialization), which can lead to incomplete context. However, when an image embedded in a document contains crucial information not captured elsewhere, information is lost if the system ignores that image or only indexes its caption.

Tabular data poses particular challenges for language model processing. Tables often contain dense information with implicit relationships between rows and columns. When simply converted to linear text or even markdown, some of these relationships are inevitably obscured or lost entirely (e.g., spans containing sums vs. repetitions). Also, large tables may contain hundreds or thousands of cells, making comprehensive inclusion impractical due to context window limitations and the associated computational burden. Yet summarizing tables risks omitting critical data points that may be relevant to specific queries. Research on enabling LLMs to handle long tables (e.g., TableRAG, 2024) highlights the difficulty of balancing completeness with context length.

Maintaining fidelity to source documents represents another ongoing challenge in all the above modalities. Summarization techniques can compress information but invariably lose details. For applications requiring high accuracy, such as legal, medical or security-relevant contexts, any information loss could be problematic. Yet preserving complete information while making it accessible for retrieval and generation exacerbates storage and bandwidth demands, further straining existing system limitations. The sheer scale of data required for lossless processing presents a significant bottleneck.

It is therefore an objective of the present disclosure to enable language models to access and utilize information with greater completeness and structural integrity, thereby overcoming the drawbacks of the prior art at least in part, and to do so in a manner that mitigates the severe computational, storage, and bandwidth requirements associated with existing methods.

SUMMARY OF THE DISCLOSURE

The above and other objectives may be achieved by the subject-matter defined in the independent claims. Advantageous modifications of embodiments of the present disclosure are defined in the dependent claims as well as in the description and the drawings.

As a general overview, aspects and embodiments of this disclosure provide a lossless hierarchical regurgitation technique that transforms source materials into an LLM-ingestible knowledge base with full retention of information. This is the basis for an end-to-end pipeline for retrieval-augmented generation which yields responses that are significantly more accurate, contextually relevant, and traceable to the original source. In essence, large language models are empowered to have a detailed, trustable memory of source materials of any size despite their inherent context window limitations.

Using the techniques described in the following, the problem of context window limitations is overcome not by lossy compression, but by intelligent reorganization and expansion of what "context" means—from a flat string of text to a rich structured document. The context length limitations and hallucination tendencies of LLMs are directly addressed in that LLMs no longer have to internalize huge raw texts or images at query time, and do not have to guess about data that was pruned or abstracted. Instead, LLMs have access to the ground truth in bite-sized pieces. The result is optimized retrieval-augmented generation where responses are more accurate, contextually relevant, and traceable to the original materials.

One aspect of the present disclosure relates to a method. The method may be a document preparation method which serves for preparing a document for retrieval-augmented generation. The method may be computer-implemented. Throughout this disclosure, any description of a method should be understood as also disclosing a corresponding computer program implementing the method and a corresponding data processing apparatus configured to execute the computer program. Likewise, any description of a method step should be understood as disclosing a corresponding operation of the computer program and a unit, module or means of the data processing apparatus.

The method may comprise receiving an input document. The input document may comprise content items. At least one of the content items may include at least one text element.

It may be provided that the method performs a lossless hierarchical regurgitation process. In the lossless hierarchical regurgitation process, the input document may be reproduced as a hierarchical representation (also referred to as "hierarchical outline"). In the hierarchical representation, preferably all text elements from the input document are preserved verbatim and organized according to a structure of the input document. In other words, the lossless hierarchical regurgitation process can reproduce an input document as a hierarchical representation, with the goal of preserving all content items which comprise text in their original form. The term "lossless" indicates that the process is possible without alteration or omission of the original text in the content items, but each content item from the input document remains verbatim. The hierarchical representation is arranged to mirror the intrinsic structural organization of the input document, allowing for clear delineation of relationships between content items, whether they are sections, paragraphs, images, or other elements.

The creation of a verbatim hierarchical representation greatly supports subsequent retrieval processes. Taking advantage of the hierarchical representation, such retrieval processes can work with complete content without reductions, allowing downstream generative language models to access a broad spectrum of information for retrieval-augmented tasks. This comprehensive access to data improves the ability to ultimately produce informed, relevant outputs that align closely with the original input document.

It may be provided that the method performs a retrieval unit generation process. In the retrieval unit generation process, retrieval units may be generated based on the hierarchical representation. Accordingly, during the retrieval unit generation process, the hierarchical representation can be analyzed to derive distinct retrieval units. These retrieval units can coincide with cohesive segments of the hierarchical representation that can be independently accessed and can be useful for retrieval purposes. Each retrieval unit can encapsulate specific content items and can maintain their verbatim fidelity.

The generated retrieval units may be stored in a repository that is accessible to a client generative language model for retrieval-augmented generation. Accordingly, the repository can operate as a structured database that offers access to a client generative language model. Such models, optimized for retrieval-augmented generation tasks, can benefit from the repository by retrieving pertinent retrieval units to inform and enhance their generative capabilities. By utilizing the repository, generative language models can directly access accurate and intact content from the input document, thus supporting more informed, contextually relevant, and precise content generation outputs.

In summary, the method according to the above aspects ensures a smooth progression from raw document input to structured content representation, leading to a robust retrieval framework that can enhance the operational efficacy of generative language models. By conserving the integrity of the original content and organizing it for retrieval, the method positions itself as a useful tool for document processing, handling, and generative applications. In particular, the proposed method addresses the critical technical limitations of large language models by fundamentally shifting the approach to document processing for retrieval-augmented generation. Instead of attempting to force entire large documents into the LLM's inherently limited context window, which leads to information loss and increases computational demands, the lossless hierarchical regurgitation process meticulously reproduces the input document into a structured, hierarchical representation, preserving every content item verbatim while organizing them according to the document's inherent structure. This initial processing step can be performed once, effectively offloading the burden of large-scale document handling.

Subsequently, the retrieval unit generation process leverages this hierarchical representation to create smaller, contextually relevant retrieval units, which can be designed to fit comfortably within the LLM's context window, enabling efficient on-demand retrieval of specific information without overwhelming the model. By focusing on these smaller units, the method can significantly reduce the processing power and energy consumption associated with each query, as the LLM only processes the necessary information.

Furthermore, this approach optimizes storage capacity by avoiding redundancy in the retrieved data, thanks to the structured organization of the hierarchical representation, and minimizes bandwidth usage by transmitting only the required retrieval units to the LLM.

In essence, the method overcomes the context window, processing power, storage, and bandwidth limitations by pre-processing the data into a hierarchical structure that is then broken into smaller retrieval units, which can be consistently de-duplicated and/or combined, so that the LLM only has to deal with small relevant chunks of data.

It may be provided that the lossless hierarchical regurgitation process comprises prompting a generative language model to generate the hierarchical representation. Prompting the generative language model may comprise instructing the generative language model to create the hierarchical representation without summarizing and/or omitting any of the text elements.

Accordingly, this aspect leverages the ability of large language models to follow instructions and copy text, thereby obtaining a faithful segmentation of the input document. The prompt instructs the language model what to do. The prompt may include instructions or cues aimed at guiding the generative language model to focus on verbatim reproduction, helping ensure preservation of every text element in the input document in its original form within the hierarchical representation. The instruction to avoid summarization or omission is part of the concept of "lossless" within the hierarchical regurgitation process. It aims to maintain that each content item is replicated closely, retaining the input document's full information richness.

It may be provided that the lossless hierarchical regurgitation process is an iterative process. The iterative process may comprise a first iteration, a second iteration, and so on. Each iteration may comprise generating a partial hierarchical representation until a processing threshold is reached. The processing threshold may be a pre-defined threshold. In one implementation, the processing threshold corresponds to a context window threshold of the generative language model in charge of processing the input document. An example of such a context window threshold is 10,000 tokens.

Each iteration may comprise compressing the partial hierarchical representation of the current iteration (and any partial hierarchical representations of previous iterations).

In all cases, such compression may be a horizontal compression, a vertical compression, or both. A horizontal compression may comprise keeping the first and last portion of a text element (e.g., the first word and the last word, the first few words and the last few words, or the like) and replacing the rest with a placeholder such as "[ . . . ]". A vertical compression may comprise, for a sequence of text elements on the same hierarchical level, keeping the first and last text elements and replacing the text elements therebetween with a placeholder such as "[ . . . ]".

Each iteration may comprise concatenating the compressed partial hierarchical representation of the current iteration (and any compressed partial hierarchical representations of previous iterations) with a delimiter followed by the unprocessed remainder of the input document. The result then serves as input for the subsequent iteration.

In a simple example for clarity, the iterative process regurgitates the first 10,000 tokens. The result is compressed horizontally and vertically. The result is concatenated with a delimiter and the still unprocessed part of the input document, and this is used as input for the second iteration. After the process has regurgitated for another 10,000 tokens, the two partial hierarchical representations (from the first and second iteration) are combined, and the combination result is compressed, and so on.

The delimiter which indicates the border between the processed and the unprocessed portion of the input document may be a mnemonic delimiter. An example is "§ $ #NEW CONTENT TO BE INDENTED FROM HERE #ES". This is advantageous because it can be readily understood by the generative language model which generates the hierarchical representation.

In this variant of the method, smoothly handling input documents that exceed the context size of the generative language model can involve an iterative approach during the lossless hierarchical regurgitation process. This process supports continuity in the structural organization throughout the iterations, providing a coherent hierarchical representation even when dealing with large volumes of data. When an input document's size surpasses the generative language model's context capacity, which may limit its ability to simultaneously hold all content items, this iterative processing divides the document into manageable sections. Each section is fed into the generative language model in succession, allowing it to focus on subsections while maintaining the holistic hierarchical framework.

A key aspect of this variant of the method is the emphasis on maintaining continuity in the structural organization across iterations. This continuity can be achieved by conserving organizational markers or depth indicators, such as headings, subheadings, formatting effects, and indentation levels. These markers can assist the generative language model in understanding the relationship between iterative sections, ensuring the hierarchy remains smooth and unified. To support the iterative process without disrupting the structural hierarchy, transition prompts or cues can guide the model in maintaining consistent organizational depth between sections.

This capability offers the potential for efficient execution of large-scale documents and ensures that generative language models can effectively process, retrieve, and generate content with maintained fidelity, even in the face of context size limitations.

It may be provided that the input document is a structured input document. In this case, the content items may be organized in the hierarchical representation according to an explicit structure in the input document.

Accordingly, structured input documents can benefit from organizing content items within the hierarchical representation according to the document's explicit structure. This organization is practical for retaining inherent structural features, likely enhancing the accuracy and relevance of the reproduced hierarchical model. Structured documents may include formats like outlines, tables of contents, or visibly marked sections and subsections. These elements may offer guidance for establishing a clear hierarchy for content representation. The method can utilize these organizational cues to construct and maintain the document's format throughout the regurgitation process.

The hierarchical representation may include aligning content items with their respective structural markers from the original document. These markers can encompass hierarchical indicators such as numbering systems, headings, subheadings, bullet points, indentation levels, or other formatting details that suggest a particular organizational layout. These markers are employable to delineate relationships and priority between content items, which may preserve the document's logical flow and visual alignment.

The structured format of the hierarchical representation supports the effective generation of retrieval units from the repository. With a well-organized foundation, downstream generative tasks are likely to access accurately indexed segments, facilitating contextually precise and logically grounded outputs.

It may be provided that the input document is an unstructured input document. In this case, the content items may be organized in the hierarchical representation according to an inferred structure of the input document. The inferred structure may be determined by the generative language model.

Accordingly, when handling unstructured input documents, the organization of content items within the hierarchical representation may rely on a structure suggested by the generative language model. This inference process offers an approach for creating coherent, logical order from documents lacking explicit structural markers. Unstructured documents are those that do not prominently define sections, subsections, or other organizational elements that guide the formation of hierarchies. Examples of such documents include free-form text, narrative content, or mixed-media pieces where traditional formatting cues might be absent. The challenge with these documents lies in rendering them into a structured format that aids clear comprehension and retrieval.

In this scenario, the generative language model can utilize its capability to understand language patterns, context, and semantic clues as well as to "think while talking" to determine a suggested structure. The model examines the document's content, identifying logical breaks, thematic shifts, or natural progressions that may indicate organizational paradigms.

Once the suggested structure is arranged, the content items can be positioned within the hierarchy, allowing the document to adopt an organized format that closely resembles structured counterparts. By employing a suggested organizational strategy, the method adapts unstructured documents into systematic, arranged representations. This framework may enhance the effectiveness of generative applications, including retrieval-augmented synthesis, as it provides a cohesive and organized database for effective downstream operations.

It may be provided that the hierarchical representation uses indentation levels to organize the content items.

In this variation of the method, the hierarchical representation of the content items from the input document utilizes indentation levels, e.g., using tabs or spaces, as the organizational tool. Indentation offers a visual and structural signal that can guide the arrangement of content into distinct hierarchical layers, fostering clarity in representation. Indentation levels can indicate the depth of hierarchy within the document, with each level representing a transition from broader categories to finer granularity. This system aids in visually distinguishing between primary content, sub-content, and subsidiary details, potentially reflecting the document's inherent or inferred organization.

The conversion of an input document into a hierarchical representation using indentation levels (e.g., via space or tab characters) offers a significant technical advantage in terms of efficient data structuring without materially increasing file size. Indentation-based hierarchies encode structural depth implicitly, thereby reducing the overhead associated with additional syntax. This lightweight structuring mechanism enables a compact representation of nested content, where each level of hierarchy is indicated by a minimal amount of whitespace rather than verbose structural markers. Consequently, the resulting file size can remain close to that of the original input document, preserving storage and transmission efficiency, which is especially important in bandwidth-constrained environments or when working with large datasets.

The use of indentation is also particularly advantageous in producing a hierarchical representation that is intuitive and accessible. For example, main sections may be presented with minimal indentation, while subsections and related elements receive progressive levels, illustrating potential content relationships and dependencies. As content is organized using indentation, it gains a visually coherent representation that can aid comprehension and navigation, both by humans and by generative language models. This hierarchy might contribute to subsequent processes, such as the automated generation and indexing of retrieval units, where coherent indentation helps efficiently retrieve contextually appropriate segments, and also manual subsequent tasks like finetuning or reinforcement learning from human feedback (RLHF).

It may be provided that the hierarchical representation uses semantic labels, such as markup elements and/or markdown elements, to organize the content items.

In this variation of the method, the hierarchical representation of the content items from the input document utilizes semantic labels, such as markup elements and/or markdown elements, as the organizational tool. Semantic labels, including markup and markdown elements, provide a framework for tagging and cataloging content. Through these elements, different sections of a document might be explicitly marked, offering insights into functional roles, hierarchical levels, and thematic divisions. Both markup and markdown can provide syntactic cues that allow systematic tagging of content, creating a hierarchy that may be visually and semantically coherent.

This approach enables the generative language model to identify and tag various content items using these semantic markers. For instance, headers, paragraphs, lists, and emphasized sections can be distinctly outlined, suggesting relationships and forming a structured representation. Using these labels adds a layer of organization that may reflect both the explicit structure of documents and inferred organization for unstructured inputs.

Additionally, this semantic tagging might enhance downstream processes, primarily retrieval unit generation and storage, along with retrieval-augmented generation. When retrieved, semantic labels could enable generative models to access indexed information more quickly, offering contextually relevant insights to inform outputs effectively. This methodological enhancement could promote more intelligible, accurate, and meaningful data utilization in generative applications.

It may be provided that the retrieval unit generation process comprises generating chunksets as the retrieval units. Each chunkset may comprise a plurality of chunks. Each chunkset may indicate a traversal path through the structure of the input document. A maximum token limit for the chunksets may be pre-defined, e.g., about 500 tokens per chunkset, or the like.

Accordingly, chunksets may serve as coherent segments extracted from the hierarchical representation, encompassing content that has meaningful interconnections and logical flow. Chunksets can function as units that outline specific pathways within the structured hierarchy of the document. These pathways might provide a mapped sequence of content items aligning with the document's organizational logic, whether inferred or explicit. By establishing traversal paths, chunksets facilitate systematic access to document segments, allowing efficient retrieval and analysis.

The process for generating chunksets covers segmenting the hierarchical representation into identifiable tracts, considering the structure and depth defined within the document model. Each chunkset may include a sequence of related content items (in the sense of chunks), maintaining verbatim fidelity and contextual relevance. This allows for the expedient retrieval of coherent information while preserving content integrity.

Prompts might guide the generative language model to recognize and organize these chunksets, emphasizing continuity and thematic coherence. These units can be labeled and stored within a repository, offering indexed access pathways that retrieval-augmented language models could use to enrich generative tasks.

Utilizing chunksets enhances the retrievability of information, which may improve the efficiency and precision of generative language model outputs. By drawing from well-structured units reflecting document complexity, models can elevate their performance, providing content that aligns with the document's original intentions and nuances.

It may be provided that generating chunksets comprises sorting chunks from the hierarchical representation by depth and position. Generating chunksets may comprise collapsing adjacent chunks at the same depth level that fit within a token limit. Generating chunksets may comprise recursively prepending higher-level parent chunks to form traversal paths. Generating chunksets may comprise creating unique combinations that maintain hierarchical relationships while optimizing token efficiency.

Accordingly, the process of generating chunksets can be refined by sorting chunks from the hierarchical representation according to depth and position, thereby providing systematic organization and efficiency. This approach aims at enhancing token usage while maintaining the structural integrity and hierarchical relationships of the document. Depth organization involves establishing the relative hierarchical level for each chunk, which can indicate the document's structural intricacies. Position organization helps ensure that chunks appear sequentially according to their appearance or positional context within the document, contributing to the continuity and flow of information. Adjacent chunks residing at the same depth level can be collapsible as long as they fit within any predefined token limit. This token limit might correspond to constraints of the generative language model, such as maximum input size. Collapsing adjacent chunks can blend related content segments, streamlining complexity while conserving space. Recursively adding higher-level parent chunks to form traversal paths can enrich the coherence and completeness of chunksets. Parent chunks represent broader hierarchical sections that provide context for associated information. By adding these parent chunks, traversal paths can incorporate both overarching themes and detailed content, enhancing the semantic context captured within each chunkset. Creating unique combinations of chunksets can preserve hierarchical relationships while optimizing token efficiency. This step fosters the development of meaningful and distinct retrieval units that align closely with the document's original structure. Emphasizing token efficiency seeks to enable models to access relevant information without overwhelming processing capacity, which may improve generative accuracy and relevance.

Together, these operations promote a methodical approach to generating chunksets, concentrating on organization, contextual integrity, and token conservation. By leveraging techniques of organizing, collapsing, adding, and optimizing, this method is suitable for producing coherent, efficient chunksets conducive to advanced retrieval-augmented generation tasks.

It may be provided that each chunkset maintains pointers to its constituent chunks.

This can be an efficient practice that aids in managing resources while preserving the fidelity of the hierarchical structure and its content. Pointers serve as referential links within the chunksets, directing to specific content items or segments in the hierarchical representation. By employing pointers, chunksets can conveniently access and utilize content without the need to replicate or store redundant copies. This way of handling chunks can conserve memory and storage resources.

The use of pointers can allow for a dynamic interaction between chunksets and their constituent chunks. This flexible relationship may support rapid retrieval when generative language models require access to particular segments during the execution of retrieval-augmented generation tasks. By referencing rather than duplicating, the model may utilize data concisely, potentially expediting access and maintaining contextual relevance.

Maintaining pointers can help ensure the hierarchical relationships among content items remain integrated and intact. These relationships may aid in retaining the document's structural logic, informing the coherence and completeness of downstream generative tasks. The inclusion of pointers might allow for the formation of retrieval units that can layer semantic and contextual threads, enhancing the depth and richness of the generative outputs.

Furthermore, by implementing pointers, the method might offer the advantage of updates or changes in the original hierarchical representation being automatically reflected in associated chunksets. This can facilitate alignment between document evolution and retrieval unit accuracy, providing flexible and adaptive content engagement.

It may be provided that storing the chunksets as the retrieval units comprises computing embeddings for each chunkset and storing the embeddings in the repository.

This approach makes sophisticated indexing and retrieval feasible by utilizing embeddings as a compact, multi-dimensional representation of the chunksets. Embeddings are numerical vectors that encode semantic information about the content and structure of the chunksets. These vectors capture notable characteristics and relationships of the content, facilitating a representation that models semantic similarities and differences between chunksets effectively. By computing embeddings, the method translates complex hierarchical content into quantifiable formats that are machine-readable and conducive to computational analysis.

Once calculated, these embeddings are suitable for storage within a repository, possibly offering improved search and retrieval functionality. The repository functions as a database for indexing these vectors, enabling swift and precise access to chunksets via their embeddings. This system can enhance retrieval efficacy by leveraging vector operations like similarity scoring, allowing generative language models access to chunksets that are relevant to tasks at hand based on semantic proximity.

Such optional embedding-driven storage can reduce retrieval effort by efficiently navigating the embeddings space without needing to process extensive raw content during each query. It minimizes processing time by utilizing precomputed semantic captures, promoting rapid interaction for retrieval-augmented generation tasks.

Moreover, storing embeddings aligns with modern machine-learning practices, where embedding spaces are useful for various applications including pattern recognition, content recommendation, and context-aware functionalities in generative models. Embeddings also support adaptive learning and contextual alignment, providing a foundation for enriching the generative model's outputs with context-appropriate and semantically informed data.

It may be provided that the method comprises a table integration process. The table integration process may comprise identifying tabular data in the input document. Such tabular data is another example of a type of content item in the input document, besides text elements. The table integration process may comprise transforming the tabular data into a tabletree representation in the hierarchical representation that preserves all data from the tabular data.

Identifying tabular data might involve detecting tables or table-like structures within the input document. This may include recognizing headers, rows, columns, and data cells that form components of typical tabular representations. The detection process can utilize document layout analysis or content parsing techniques to reliably extract tabular data from various document formats, allowing these informational structures to be interpreted accurately.

Once identified, the tabular data is transformable into a tabletree representation. A tabletree can act as a tree-like hierarchical model reflecting structural layout and data relationships inherent in the original tables. This representation may maintain the organization of rows and columns, interlinking data cells according to their relational significance within the original tabular formatting.

During transformation, care may be taken to reflect all data elements from the tabular source, aiming to preserve semantic integrity and data fidelity. Headers, column labels, and data entries are transcribed to ensure their inclusion within the hierarchical model, allowing tabular elements to be accessible and meaningful within the broader context of the hierarchical representation.

The tabletree representation may offer several benefits for generative language models. It organizes data in a format that respects the logical connections within tabular data.

This conversion aids retrieval operations, enabling the models to interpret and incorporate structured datasets into content generation processes, supporting synthesis that leverages tabular insights.

Integrating tabletrees into the hierarchical representation aligns with the method's approach to document fidelity, offering generative tasks access to both narrative and data-rich components of a document. This integration can enable generative language applications with expanded ability to process, understand, and generate content rooted in complex tabular information.

It may be provided that the tabular data is below a predetermined size threshold. In this case, transforming the tabular data can comprise prompting a generative language model to transform the tabular data into the tabletree representation.

Accordingly, when the tabular data falls below a size threshold, transformation into a tabletree representation may involve guiding a generative language model with specific prompts. This approach can facilitate handling smaller datasets efficiently, providing an option for streamlined processing that maintains content integrity and enhances context.

The predetermined size threshold could reference a criterion that defines the scope or extent of tabular data considered suitable for direct generative transformation. This concept might optimize conditions under which generative language models can perform effectively, potentially managing complexity and enhancing resource usage.

For smaller tabular datasets meeting this threshold, prompts may tailor the transformation process by directing the generative language model's focus on accurately recasting tabular structures into hierarchical tabletrees. These prompts may steer the model to recognize tabular elements, such as headers, rows, columns, and data point interrelationships. Through this guided engagement, the model may work to translate tabular datasets into textual hierarchical formats comprehensively. Using generative language models with prompts for transforming small-scale tabular data may provide benefits in terms of speed and efficiency. The model might execute transformation tasks rapidly, translating structured data into organizational hierarchies while keeping computational demand low. This method can align well with operations where quick interaction between data interpretation and representation supports task requirements.

It may be provided that the tabular data exceeds a predetermined size threshold. In this case, transforming the tabular data may comprise prompting a generative language model to generate executable code that transforms the tabular data into the tabletree representation, and executing the generated code to produce the tabletree representation. "Generating executable code" may also comprise generating parameters for existing code, rather than creating the actual code.

Accordingly, when the tabular data surpasses a specified size threshold, the method may prompt a generative language model to craft executable code aimed at transforming this data into a tabletree representation. Following this, the generated code can be executed, allowing the desired tabletree structure. This approach suggests a mechanism for handling larger datasets, utilizing both interpretative and computational capabilities of generative language models. The generative language model might utilize prompts focused on analyzing the tabular data's structure and semantics. These prompts guide the model in generating executable code tailored to organize the hierarchical structure within the tabletree format. This code can include instructions to handle relationships, categorical divisions, and interconnections present in the extensive tabular dataset.

Executing the generated code facilitates the transformation, suggesting that larger datasets can be systematically processed into tabletree representations while maintaining content and contextual richness. The execution process involves running the code instructions, converting tabular elements into well-organized, hierarchical structures. The creation and execution of model-generated code offer scalability in transformation tasks, optimizing operations when managing extensive tabular data challenges. This framework handles the complexity found in larger datasets, aiming to preserve semantic integrity and hierarchical organization while balancing system resources.

It may be provided that the method comprises a multimodal content integration process. The multimodal content integration process may comprise identifying a non-textual element in the input document. Such non-textual elements are another example of a type of content item in the input document, besides text elements and tabular data. The multimodal content integration process may comprise integrating a textual representation of the non-textual element into the hierarchical representation.

Accordingly, non-textual elements present in the input document can be identified and connected into the hierarchical representation through a textual representation. This approach aims to enhance the comprehensiveness and accessibility of the hierarchical model by accommodating diverse data types effectively. Non-textual elements in documents might encompass images, diagrams, charts, audio clips, video segments, or other multimedia components. Identifying these elements may involve techniques capable of detection and classification, such as image recognition, multimedia parsing, or audiovisual analysis. Harnessing such technological capabilities facilitates the precise extraction and subsequent connectability of these elements within the hierarchical framework. Once identified, the non-textual elements can be transformable into equivalent textual descriptions that encapsulate their semantic content and functionality. This textual representation may employ descriptive language that captures key aspects like compositional details, thematic purposes, or contextual roles within the original document. Such translation encodes non-textual data into an accessible format that interacts seamlessly within the hierarchical representation. Through integration, this practice ensures that multimodal elements can become part of the cohesive organizational structure, enriching the scope and depth of the hierarchical model. This holistic approach may enable generative language models to engage with and synthesize information that spans textual and non-textual domains, potentially enhancing the capacity for retrieval-augmented generative applications. Including textual representations of multimodal elements might aid in providing comprehensive context and facilitate a more robust semantic understanding of the document. This method promotes improved navigation and retrieval, allowing downstream generative processes to draw enriched information aligned with both core textual content and embedded semantic narratives.

It may be provided that integrating the textual representation comprises generating a textual description of the non-textual element, inserting the textual description in the hierarchical representation at a position corresponding to the non-textual element's location in the input document, and storing the original non-textual element with a reference identifier linked to its textual description in the hierarchical representation. This can help balance information fidelity with organized accessibility for enhanced retrieval and generative tasks. Storing the original non-textual element with a reference identifier enables the accessibility of the element. This identifier acts as a linking mechanism, associating the textual description with its source data to facilitate easy retrieval and referencing. Through such linking, the descriptive text fits into an enriched organizational framework, supporting tasks that require both narrative interpretations and direct access to non-textual formats.

It may be provided that generating the textual description comprises invoking a vision-capable language model to describe an image. Accordingly, one strategy may involve invoking a vision-capable language model to describe an image. These models can process visual inputs, identifying patterns, objects, contexts, and thematic relevance to formulate a descriptive narrative. With the aid of advanced computational vision, these models can generate text that captures salient details of the image, indicating its role and importance in the document framework It may be provided that generating the textual description comprises applying optical character recognition to extract text from the image. Accordingly, another strategy might include applying optical character recognition (OCR) to extract text embedded within images. OCR technology can detect and transcribe characters from images, converting visual text formats into accessible textual data. By extracting textual elements, OCR contributes to transforming visual information into a structured form that corresponds with the hierarchical representation goals.

It may be provided that generating the textual description comprises extracting metadata associated with the non-textual element. Accordingly, extracting metadata associated with the non-textual element offers yet another possibility. Metadata provides extensive information related to properties, context, creation, and usage of non-textual elements. Leveraging metadata can offer insights into the element's role and content attributes, aiding in the generation of a comprehensive textual description.

In summary, whether invoking vision-capable language models, applying OCR, or utilizing metadata extraction, the method concentrates on offering effective tools for generating accurate textual representations and amplifying document processing capabilities for improved synthesis and retrieval interactions. These approaches illustrate the translation potential of advanced technologies and methodologies in converting diverse non-textual inputs into structured text, fostering enhanced accessibility within retrieval-augmented generative language models and supporting a more enriched interaction with document complexities.

It may be provided that the method comprises receiving a query. The method may optionally comprise embedding the query. The method may comprise identifying chunksets relevant to the query. Relevant chunksets may be identified by comparing the embedded query with stored chunkset embeddings, and/or by comparing the query with stored chunksets. The method may comprise assembling a context document from chunks referenced by the identified chunksets.

Accordingly, the method may also cover the processing of a query, allowing to access relevant information stored within the hierarchical representation quickly and accurately. Upon receiving a query, an embedding may be generated, which is a vector representation that reflects the semantic and/or contextual characteristics of the query. This query embedding may mirror the process employed in chunkset embedding, using numerical vectors to represent these segments in a machine-readable format. Aligning query embedding with chunkset embeddings enables direct comparison in a multidimensional vector space. The identification process may examine similarities between the embedded query and stored chunkset embeddings. Through comparison, the system may identify chunksets that show high relevance and semantic proximity to the query. This approach can optimize retrieval by focusing on the more meaningful and contextually aligned chunksets, allowing efficient access to pertinent data.

In addition or alternatively, the method may support full-text comparisons between the raw query text and the textual content of the chunksets, such as through keyword matching, fuzzy search, and/or syntactic similarity scoring. A hybrid approach may further combine both techniques, embedding-based similarity and full-text matching, to enhance retrieval accuracy. For example, the system may use embeddings to narrow down a candidate set of chunksets and then apply text-based scoring to refine the results. This flexible querying strategy allows the system to efficiently access and rank information in a manner that balances semantic relevance with textual specificity.

Once relevant chunksets are identified, organizing a context document (also called "cheatsheet") may involve arranging chunks referenced by these chunksets into a coherent narrative. This document synthesizes retrieved information into a format closely connected to the query's intent, offering a consolidated view of related content that informs further generative processes or satisfies user needs.

These operations might enhance retrieval and context generation, integrating smoothly with generative language models and supporting applications where swift and accurate synthesis of document data can be beneficial. By relying on embedding alignment and chunkset referencing, the method can facilitate interactions with document repositories, augmenting generative capabilities with enriched contextual inputs.

It may be provided that assembling the context document comprises extracting chunks referenced by the identified chunksets, maintaining hierarchical relationships between the extracted chunks, and/or assembling the extracted chunks into a coherent document while preserving structure information such as indentation.

Accordingly, extracting chunks referenced by the identified chunksets can facilitate obtaining specific content aligned with the query's semantic focus. This extraction can involve accessing stored chunks within the identified chunksets and isolating them as building blocks for the context document. These chunks capture targeted information that aligns with the query, enabling the formation of a document addressing specific user or model needs. Considering hierarchical relationships between the extracted chunks supports the preservation of interconnections and logical flow originally established in the hierarchical representation. Hierarchical consideration can enhance the coherence and contextual linkage of extracted content, where parent-child relationships and depths of detail remain intact during document construction. These relationships promote comprehension and narrative cohesion, enhancing informational richness relative to the original input structure. Assembling the extracted chunks into a coherent context document can involve careful integration and organization, potentially using structural indications, such as indentation, to ensure the document reflects the structured genetics of the source material. Indentation and structural markers guide the visual aspect of the document's hierarchy, delineating distinctions and organizing flow in a manner that retains semantic clarity and navigational ease. This assembling process can enhance the generative language model's synthesis capabilities by facilitating access to a consolidated and contextually enriched document suitable for downstream processing. Generative tasks utilize such coherent documents to produce informed, relevant, and precise outputs, closely aligning with the query and its semantic intent.

It may be provided that the assembled context document exceeds a context window of the client generative language model. In this case, the method may further comprise prioritizing chunks based on relevance to the query while maintaining hierarchical integrity.

Accordingly, when the assembled context document extends beyond the context window limitations of the client generative language model, the procedure can optionally adjust by favoring chunks based on their relevance to the query, aiming to maintain hierarchical integrity. This approach intends to balance contextual depth and content capacity effectively within technical limits. Recognizing when the context document potentially surpasses the context window involves understanding the boundaries and processing capability of the client generative language model. Surpassing this window may prompt a need to condense or refine the document content to suit the generative model's operable framework. The prioritization of chunks based on relevance can involve assessing each extracted chunk's significance and contribution toward addressing the query. Chunks showing greater semantic relevance or those directly associated with the key aspects of the query might be given preference, ensuring that significant content is foregrounded within the context document. This evaluation may utilize scoring or ranking mechanisms that assess semantic alignment or importance of content pieces.

Simultaneously, maintaining hierarchical integrity can be beneficial to preserve the organizing logic and relational depth characteristic of the initial hierarchical representation. Even amidst prioritization, retaining hierarchical relationships might aid understanding and continuity, ensuring that the context document maintains thematic narratives and interconnections reflective of the original input document. This hybrid process potentially provides the generative language model access to substantial and targeted content suitable for operational constraints while still aligning with user demands or system queries. It encourages content efficiency and coherence, emphasizing relevance and preserving information structure, which may improve the generative model's capacity for accurate outputs.

It may be provided that the method further comprises providing the assembled context document and the query to the client generative language model to generate a response.

Accordingly, this step connects the interaction between structured data and query dynamics, aiming to deliver contextual and semantically informed answers or content synthesis. Access to the context document enables the generative language model to access a tailored compilation of information directly relevant to the query. This document includes prioritized and hierarchically aligned content, which helps ensure that the model works with well-organized data suitable for the generative goals. Together, the context document and query form a dual-input system that suggests how the generative language model can approach the task at hand, guiding its processes towards precise and relevant outputs. The client generative language model can use the given information to navigate complex layers of meaning, semantics, and context, generating a response that aligns with the query's objectives and accesses the richness of the assembled context document. This response generation process draws from the pre-structured document elements, employing generative techniques to synthesize, analyze, or transform content in line with desired task objectives.

It may be provided that each chunk maintains reference information indicating its source location in the input document. In this case, the client generative language model may be instructed to include the reference information when quoting from the context document.

Accordingly, including reference information for each chunk might involve storing metadata that links to its original place within the input document. This can encompass details such as section headers, paragraph numbers, page numbers, or other markers that indicate the original context of the content. These reference details are useful in ensuring that when content is retrieved or synthesized, its provenance and location within the initial document can be accessed. Providing instructions to the generative language model to incorporate reference information might introduce accountability and transparency to its outputs. When quoting or referencing content from the context document, this practice can include citation-like elements, thereby illustrating the origin of the information and supporting the accuracy and fidelity of synthesized responses. This process has advantages in applications where documentation standards, validation, or verifiability are essential. For instance, academic research, legal documentation, or technical analysis tasks benefit from detailed referencing, which assists users in tracing content back to its original scope.

It may be provided is it determined that the query requires information from a specific non-textual element. In this case, the method may comprise retrieving the original non-textual element based on its reference identifier in the hierarchical representation and providing the original non-textual element to the client generative language model.

Accordingly, such retrieval can utilize the earlier established reference identifier that connects non-textual elements to their representations within the hierarchy. These identifiers serve as access keys, facilitating systematic retrieval from storage while maintaining content fidelity. Focusing on identifiers allows the retrieval mechanism to acquire the relevant non-textual data in a nuanced manner. Once retrieved, providing the original non-textual element to the client generative language model aims to enhance content engagement. Offering this element alongside the structured document data allows the model to address the query comprehensively, leveraging pertinent informational assets. This could enhance the model's ability to synthesize inputs, integrating narrative elements and functional insights derived from the non-textual data. Including non-textual elements in responses can deliver advantages when visual, auditory, or multimedia data provide contextual understanding that might be challenging to capture textually. The method seeks to improve responsiveness, enriching generative applications with a diversity in content types and fostering a holistic response strategy.

This setup aims to strengthen the ability to address queries that might require detailed non-textual data, promoting inclusive document processes while aiming to preserve interaction fidelity across various content dimensions. Overall, this approach seeks to optimize document processing workflows, emphasizing comprehensiveness and contextual accuracy in generative tasks, aiming to bridge textual and non-textual domains effectively It may be provided that the method further comprises detecting an update to the input document, identifying portions of the hierarchical representation affected by the update, and selectively regenerating only the affected portions of the hierarchical representation.

Accordingly, detecting updates to the input document can prompt a responsive action where affected portions of the hierarchical representation are identified. This identification is connectable with the selective regeneration of just those segments, fostering efficiency and accuracy in the document management process. Detecting updates to the input document may involve monitoring and recognizing changes as they occur, whether through direct modifications, revisions, or supplemental data integration. This detection process is applicable for techniques like document comparison algorithms, change tracking systems, or real-time monitoring configurations that deduce alterations. Once an update is detected, identifying portions of the hierarchical representation affected can include determining the extent and nature of the changes. This might involve evaluating how alterations influence specific content segments within the hierarchy, focusing on placements where differences arise, and tracing ramifications throughout connectable relational nodes. Selectively regenerating the affected portions may transform only those segments influenced by the update, conserving computational resources and enhancing processing efficiency. This focused regeneration process keeps the hierarchical model current, avoiding a comprehensive overhaul when it is not particularly required. It maintains content fidelity while respecting existing organizational logic that remains unchanged. The capability of selectively regenerating portions allows for real-time adaptability, enabling continued operation across generative and retrieval applications while minimizing disruption. This methodology can be useful for dynamic document interaction environments where data evolves, ensuring that processing models remain aligned with the current document status. Overall, by detecting, identifying, and selectively regenerating, this method aims to propose processes that balance efficiency and precision in document handling, nurturing adaptive and responsive frameworks for engaging with evolving document landscapes, and offering enhanced interaction paradigms for advanced generative language applications.

It may be provided that the method further comprises creating a multi-document hierarchy. The multi-document hierarchy may be created by generating a hierarchical representation for each of multiple input documents and creating a higher-level hierarchical representation that organizes the collection of hierarchical representations.

Accordingly, the method can extend its scope by allowing a multi-document hierarchy, which involves generating hierarchical representations for each of multiple input documents and crafting a higher-level hierarchical framework to collectively organize these individual representations. This advancement may facilitate the management and retrieval of interconnected data across various document sources while maintaining structured clarity. Generating hierarchical representations for each input document follows processes similar to those described, focusing on verbatim fidelity and organized structure for each document independently. Each hierarchical model reflects the content's inherent depth, organization, and contextual characteristics, providing a systematic framework to interact with the document data. Upon completing individual representations, creating a higher-level hierarchical representation integrates these models into a comprehensive and unified document structure. This overarching hierarchy may serve as a taxonomy or schematic, organizing interrelationships and shared themes or categories that crosscut the span of all included documents. This integration can harness cross-document semantic relationships, illuminating insights that contextualize topics or themes present across different sources. Techniques are employed to recognize and characterize content overlaps, thematic continuities, or categorical division, forming a meta-structure that communicates coherence and cohesiveness. Such multi-document hierarchies could prove advantageous in complex information ecosystems, allowing efficient retrieval and synthesis across multiple document inputs. By organizing information within this higher-level hierarchy, models may interact dynamically with expansive content collections, enabling generative language tasks to access context-rich data while maintaining integrity or precision. In sum, creating a multi-document hierarchy offers a robust framework to manage, retrieve, and synthesize comprehensive document datasets, optimizing generative model interactions by aligning structured knowledge across multiple sources for enriched content generation. This approach emphasizes interconnected document representation and retrieval clarity, supporting nuanced and coherent multivariate document handling.

Another aspect of the present disclosure relates to a data processing system, apparatus or device. The data processing system, apparatus or device may comprise means for carrying out any combination of steps of the described methods. The data processing system, apparatus or device may comprise a memory and a processor. The memory may store, or be configured to store, instructions that, when executed by the processor, configure the data processing system, apparatus or device to carry out any combination of steps of the described methods.

Another aspect of the present disclosure relates to a data processing apparatus comprising a processor and a memory. The memory stores instructions that, when executed by the processor, configure the apparatus to receive an input document, the input document comprising content items, perform a lossless hierarchical regurgitation process, in which the input document is reproduced as a hierarchical representation in which all content items from the input document are preserved verbatim and organized according to a structure of the input document, and perform a retrieval unit generation process, in which retrieval units are generated based on the hierarchical representation and stored in a repository that is accessible to a client generative language model for retrieval-augmented generation.

Another aspect of the present disclosure relates to a computer program. Another aspect of the present disclosure relates to a non-transitory computer-readable medium having stored thereon a computer program. In both cases, the computer program may comprise instructions which, when the program is executed by a computer, such as the mentioned data processing system, apparatus or device, cause the computer to carry out any combination of steps of the described methods. A computer program may also be referred to as a program, software, a software application, an app, a module, a software module, a script, or code. A computer program may be written in a programming language, including compiled or interpreted languages. A computer program may be deployed in any form, including as a stand-alone product or as a module, component, subroutine, or other unit suitable for use in a computing environment, such as on the mentioned data processing system, apparatus or device.

Another aspect of the present disclosure relates to a computer-readable medium on which computer-executable instructions are stored to implement a method comprising receiving an input document, the input document comprising content items, performing a lossless hierarchical regurgitation process, in which the input document is reproduced as a hierarchical representation in which all content items from the input document are preserved verbatim and organized according to a structure of the input document, and performing a retrieval unit generation process, in which retrieval units are generated based on the hierarchical representation and stored in a repository that is accessible to a client generative language model for retrieval-augmented generation.

Another aspect of the present disclosure relates to a server for providing retrieval-augmented generation services. The server may comprise one or more processors and a memory. The memory may store instructions that, when executed by the one or more processors, cause the server to carry out any combination of steps of the described methods.

Another aspect of the present disclosure relates to an application programming interface (API) for providing retrieval-augmented generation functionality. The API may comprise a document ingestion endpoint configured to carry out any combination of steps of the described methods.

The aspects and features described above and elsewhere in this disclosure, when implemented jointly or individually, can bring about several advantageous effects, including without limitation:

Context overflow in large language models can be reduced.

Hallucination can be mitigated by preserving original text.

Large documents can be restructured into a hierarchical outline without omitting any content.

Structured data such as tables can be converted into textual tree formats that preserve every data cell.

Script-based transformations can be employed for large-scale tabular data.

Images, code snippets, and other non-text media can be integrated via textual representations for unified multimodal indexing.

Chunksets can be formed which reflect the parent-child relationships within the outline to optimize token usage.

Dynamic assembly of relevant hierarchical segments can enhance retrieval-augmented generation for answering queries.

Exact phrase-level fidelity can be retained in the hierarchical chunks, enabling precise quotation from the source.

Incremental updates to source documents can be selectively applied to maintain the hierarchical representation.

Multiple documents can be organized in a multi-level hierarchy for corpus-wide retrieval.

Each chunkset can maintain references to its source location for transparent attribution in generated responses.

The terms used herein should generally be construed as understood by the average person skilled in the art, unless explicitly indicated otherwise. The following explanations may guide the understanding:

The term "Artificial intelligence" (AI) may be understood as referring to a branch of computer science that aims to develop machines or software capable of intelligent behavior, typically with the goal to mirror or surpass human intelligence in specific tasks. AI systems are designed to perform complex tasks such as reasoning, learning, perception, problem-solving, and understanding natural language. These systems can typically adapt to new situations and improve their performance over time. The goal of AI is to create systems that can function autonomously and interact with their environment in a human-like manner.

The term "Artificial neural network" (ANN), or "neural network" (NN) in short, may be understood as a machine-learning model or deep-learning model or algorithm. Neural networks are generally inspired by the human brain and typically comprise interconnected nodes or neurons organized into layers. Neural networks can be used to process data and learn from examples, enabling them to perform tasks such as image recognition, natural language processing, and more. A neural network typically comprises an input layer, one or more hidden layers, and an output layer. Through a process called training, neural networks can learn to perform specific tasks by adjusting their internal parameters, or "weights", based on labeled or unlabeled data.

The term "Chunk" may be understood as a segmented portion of a content item, or a combination of segmented portions of one or more content items, created through a chunking process. A chunk typically represents a discrete unit of information derived from an input document, designed to facilitate efficient retrieval and processing within a RAG system.

The term "Chunkset" may be understood as collections of one or more chunks that represent a coherent portion of the hierarchical representation. A chunkset may indicate parent-child relationships. Examples include chunks grouped by heading levels and appended with corresponding sub-sections, or aggregated text blocks that fit within a specified token limit while including necessary context.

The term "Content item" may be understood as a discrete unit of information within an input document, representing a semantically or structurally distinct portion of the data. A content item can be of various data types, including but not limited to, text, numerical data, images, audio segments, video segments, or any combination thereof.

The term "Context document", also referred to as "cheatsheet", may be understood as a document, preferably a text document, assembled from relevant retrieval units or chunksets, preserving structural or contextual cues to help a generative machine-learning model respond accurately to a query.

The term "Context size" as well as variations such as "context limit", "context limit", "token limit", and similar expressions known to the skilled person, may be understood as the maximum number of tokens or amount of data a generative machine-learning model, such as a generative language model or LLM, can process or maintain in its memory-like context window at once. For example, the phrase "token limit" may refer to an upper boundary on the number of textual units (e.g., subword units or tokens) that are included in a chunk or chunkset to remain within a model's processing capabilities.

The term "Generative language model", also referred to as "language model", may be understood as a type of machine-learning model configured for natural language processing tasks such as language generation. Generative language models typically have a very large number of parameters and are trained on a vast amount of text.

Throughout the present disclosure, the term "generative language model" or similar terms are used as a synonym for "large language model" (LLM) unless explicitly indicated otherwise. An LLM is a type of machine-learning model that has been trained to recognize, generate, translate, and/or summarize vast quantities of written human language and textual data. LLMs are notable for their ability to achieve general-purpose language generation. LLMs comprise a large number of parameters, typically in the millions or often billions of parameters, which enable them to capture a wide array of linguistic nuances, patterns, and contexts Although (large) language models (also referred to as generative language models) are described throughout this disclosure, it is apparent that the disclosed concepts may be put into practice equally by using other similar types of machine-learning models, such as (large) action models, to name just one example. As a result, all features disclosed herein should be understood to be applicable to any type of machine-learning model unless a specific type of model is required for the particular feature as apparent from the context.

The term "Hierarchical representation", also referred to as "hierarchical outline", may be understood as a structured format in which the content items from the input document are organized in nested levels corresponding to their relative position within the input document, preserving every text element verbatim.

The term "Indentation level" may be understood as a means of visually or symbolically representing hierarchical depth by surrounding, in particular prefixing, content with varying degrees of indentation, thus organizing data in a structured manner. Examples of specific indentation implementations include increasing tabs or space characters.

The term "Input document" may be understood as any digital, digitized, or otherwise machine-readable data structure or sequence of data, typically in the form of a file or collection of files. Examples of input documents are, without limitation, text files, PDF documents, word processing files, presentation slides, spreadsheets, scanned documents, HTML documents, XML documents, JSON documents, image files, audio files, video files, database records, and combinations thereof, which serve as the source of information for processing by the described methods. An input document may be structured or unstructured, and may originate from local storage, network resources, or real-time data streams.

The term "Lossless hierarchical regurgitation process" may be understood as a computer-implemented procedure by which the text elements, and preferably the entire content items, of the input document is reproduced and restructured into a hierarchical representation without omitting or summarizing any content, preserving all text elements verbatim.

The term "Machine learning" may be understood as a subset of artificial intelligence that focuses on the development of algorithms and statistical models that enable computers to perform specific tasks without using explicit instructions. Instead, machine-learning systems learn and make predictions or decisions based on data. Machine-learning algorithms build a mathematical model based on sample data, known as training data, to make predictions or decisions without being explicitly programmed to perform the task. Machine learning can be employed in a variety of applications, including image and speech recognition, medical diagnosis, predictive analytics, and many more, where it enables systems to learn from and adapt to new data independently.

The term "Machine-learning algorithm" may be understood as a computational procedure that is designed to analyze data, learn from it, and identify patterns or make decisions based on the input data without being explicitly programmed for the task. Machine-learning algorithms leverage statistical techniques to enable systems to improve their performance on a specific task with more data over time. Machine-learning algorithms are the foundation upon which machine-learning models are built, providing the methods or processes through which data is transformed into actionable insight. Examples of machine-learning algorithms include linear regression, decision trees, support vector machines, and neural networks, among others.

The term "Machine-learning model" may be understood as referring to the output generated when a machine-learning algorithm is trained on a dataset. It represents the knowledge or understanding gained by the algorithm from the data, encapsulating the learned patterns or predictions. Essentially, a machine-learning model is what enables predictions or decisions based on new, unseen data, based on the learning it has derived from the training process. The machine-learning model is typically defined by its parameters, which may be adjusted during the training phase to minimize the difference between the predicted outcome and the actual outcome. Although, strictly speaking, "machine-learning algorithm" and "machine-learning model" have distinct definitions, it is not uncommon for these terms to be used interchangeably in casual discourse. This usage stems from the close relationship between algorithms and models in the workflow of machine-learning projects, where the algorithm is the means of creating the model. Therefore, these terms may be used synonymously herein unless the distinction is decisive The term "Multimodal content integration process" may be understood as a computer-implemented procedure for identifying and incorporating non-textual elements, such as images, audio, or video, into the hierarchical representation by associating a textual counterpart at an appropriate structural point.

The term "Natural language processing" (NLP) may be understood as referring to a field of computer science and artificial intelligence that focuses on enabling computers to understand, interpret, and/or manipulate human language. It typically combines computational linguistics with statistical, machine learning, and deep-learning models to process human language in the form of text or voice data, allowing computers to comprehend the intent and sentiment of the speaker or writer. NLP usually involves tasks such as text and speech processing, natural language understanding, text analytics, and it has various applications, including machine translation, speech recognition, and chatbots for customer service, to name just a few.

The term "Non-textual element" may be understood as a special type of content item that does not primarily consist of human-readable language characters, words, or symbols. Non-textual elements may include, but are not limited to, images, audio segments, video segments, numerical data, graphical representations, and metadata. Non-textual elements may be embedded within or associated with text element within an input document.

The term "Query" may be understood as a request for information, typically formulated as a prompt in natural language text, intended to retrieve relevant content from a data source within a RAG process.

The term "Repository" may be understood as a data storage system configured to store and manage data such as content items, chunks, chunksets, hierarchical representations, context documents, or representations thereof, for subsequent retrieval. One example of a repository is a vector database configured to store vector embeddings, enabling retrieval based on semantic similarity using vector distance metrics.

The term "Retrieval unit" may be understood as discrete segments, chunks or chunksets of the hierarchical representation. A retrieval unit may maintain references to the original content but may be sized and organized for efficient retrieval by a generative language model. Examples include individual paragraphs with parent-child relationships preserved, sets of bullet points grouped by heading, or combined text blocks that fit within a predefined token limit.

The term "Retrieval unit generation process" may be understood as a computer-implemented procedure that systematically creates modular chunks of information, or "retrieval units," derived from a hierarchical representation in a manner that facilitates later retrieval and recombination. Example implementations may include code that splits an outlined document, i.e., a hierarchical representation of an input document, into several smaller segments ("chunks") based on depth and/or size constraints.

The term "Retrieval-augmented generation" (RAG) may be understood as a technique that enables generative artificial intelligence models to retrieve and incorporate new information. RAG modifies interactions with a large generative language model (LLM) so that the model responds to queries with reference to a specified set of documents, using this information to supplement information from its pre-existing training data. This allows LLMs to use domain-specific and/or updated information.

The term "Table integration process" may be understood as a computer-implemented procedure for converting tabular data from an input document into a format suitable for the hierarchical representation in a way that maintains its original logical layout or data relationships.

The term "Tabletree representation" may be understood as a specialized format designed to capture tabular data as nested textual elements while preserving row-column relationships.

The term "Tabular data" may be understood as a special type of content item comprising data organized into rows and columns. Each row typically represents a record and each column represents a specific attribute or field associated with that record. Tabular data may be represented in various formats, including but not limited to, comma-separated values (CSV), tab-separated values (TSV), spreadsheets, database tables, and data frames. Tabular data may in turn contain text element, non-textual element, or a combination thereof.

The term "Text element" may be understood as a special type of content item comprising a sequence of characters, words, or symbols representing human-readable language. A text element may be a single word, a phrase, a sentence, a paragraph, or any other contiguous or non-contiguous portion of textual data extracted from an input document.

The term "Training" may be understood as referring to the process of teaching a machine-learning model to make predictions or decisions, by exposing it to data for which the outcomes are known. The training process typically involves feeding a training dataset into a machine-learning algorithm, which then uses statistical analysis to learn the patterns or relationships within the data. During training, the algorithm iteratively adjusts the parameters of the model to minimize the difference between the predicted outcomes and the actual outcomes in the training data. This adjustment process is typically guided by a loss function, which measures the accuracy of the model's predictions. The goal of training is to produce a model that accurately represents the underlying structure of the data, enabling it to make reliable predictions about new, unseen data. Supervised learning involves training a model on a labeled dataset, where each example in the training data is paired with the correct output. The model learns to predict the output from the input data. Unsupervised learning involves training a model on data without labeled responses. The model tries to find patterns and relationships in the data on its own. Semi-supervised learning combines both labeled and unlabeled data during the training process, which can be beneficial when acquiring a fully labeled dataset is costly or impractical.

The term "Verbatim" may be understood as preserving the original word-for-word text, punctuation, and other textual or symbolic elements without modification or with only minimal cleaning that does not alter the substantive content, such as removing extraneous whitespace, correcting obvious encoding errors, or normalizing line breaks, while maintaining the essential wording of the original text.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure.

BRIEF DESCRIPTION OF THE DRAWINGS

The present disclosure may be better understood by reference to the following drawings:

FIG. 8 illustrates an example of an input document in accordance with one embodiment.

FIG. 9A illustrates a first chunk created from the input document in FIG. 8 using LlamaCloud.

FIG. 9B illustrates a second chunk created from the input document in FIG. 8 using LlamaCloud.

FIG. 9C illustrates a third chunk created from the input document in FIG. 8 using LlamaCloud.

FIG. 9D illustrates a fourth chunk created from the input document in FIG. 8 using LlamaCloud.

FIG. 9E illustrates a fifth chunk created from the input document in FIG. 8 using LlamaCloud.

FIG. 9F illustrates a sixth chunk created from the input document in FIG. 8 using LlamaCloud.

FIG. 10 illustrates a hierarchical representation created for the example input document in FIG. 8 in accordance with one embodiment.

FIG. 11A illustrates a first chunkset created for the example input document in FIG. 8 in accordance with one embodiment.

FIG. 11B illustrates a second chunkset created for the example input document in FIG. 8 in accordance with one embodiment.

FIG. 11C illustrates a third chunkset created for the example input document in FIG. 8 in accordance with one embodiment.

FIG. 12 illustrates a cheatsheet created for the example input document in FIG. 8 in accordance with one embodiment.

FIG. 13 illustrates a schematic block diagram of computer hardware on which embodiments of the present disclosure can be implemented.

DETAILED DESCRIPTION

In the following, representative embodiments illustrated in the accompanying drawings will be explained. It should be understood that the illustrated embodiments and the following descriptions refer to examples which are not intended to limit the embodiments to one preferred embodiment.

Conventional RAG pipelines typically suffer from fragmented contexts, semantic incoherence, token inefficiency, hallucinations, and compromised data fidelity.

Summarization-based hierarchical methods (e.g., RAPTOR) introduce abstraction inaccuracies, losing critical details. Existing chunking solutions, such as zChunk, provide flat segmentation without exploiting full hierarchical semantic comprehension.

Various embodiments provide a solution to these shortcomings by providing a lossless, multimodal-compatible, and structurally faithful ingestion methodology that ensures absolute data fidelity for precision-critical applications.

Overview

Figure 1:
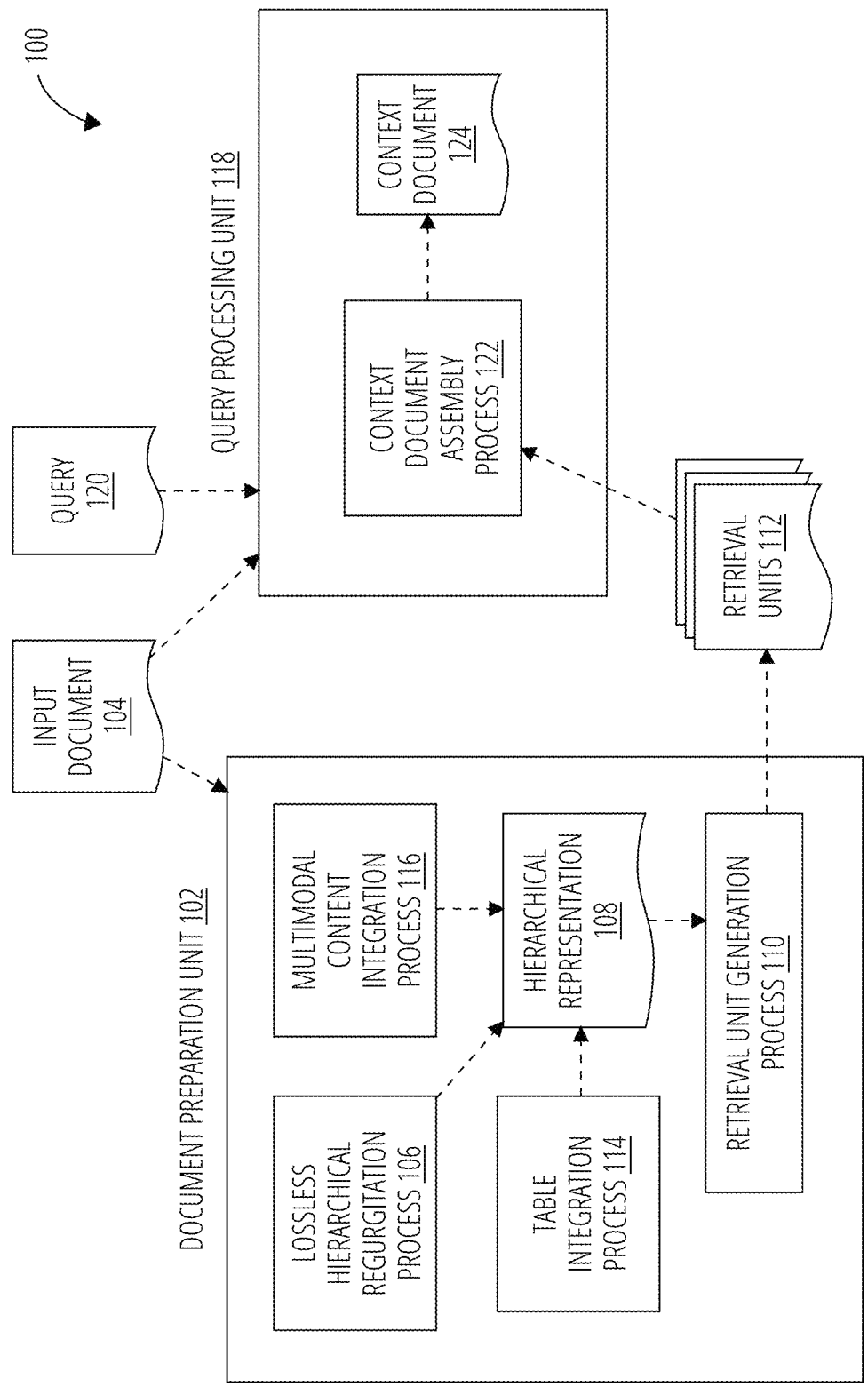
FIG. 1 illustrates a schematic overview of a processing pipeline that provides advanced hierarchical chunking, multimodal integration, and retrieval optimization in accordance with one embodiment.

FIG. 1 illustrates a schematic overview of a processing pipeline 100 that provides advanced hierarchical chunking, multimodal integration, and retrieval optimization according to an exemplary embodiment.

In the illustrated embodiment, the processing pipeline 100 comprises a document preparation unit 102 in charge of preparing an input document 104 so that its content can be efficiently used during a later query processing. The input document 104 comprises various content items. These content items may include text, tables, images, and other multimedia elements.

The document preparation unit 102 comprises a lossless hierarchical regurgitation process 106. In one implementation, the lossless hierarchical regurgitation process 106 employs explicit prompts instructing LLMs to reproduce an input document 104 verbatim in a hierarchical representation 108 via incremental indentation, leveraging implicit semantic understanding. Standard-length input documents 104 can undergo single-pass hierarchical indentation prompting, whereas overlong input documents 104 can utilize iterative multi-round prompting, ensuring lossless hierarchical continuity with explicit delimiters.

The document preparation unit 102 comprises a table integration process 114. In one implementation, the table integration process 114 transforms complex tabular data into structured, hierarchical textual representations, maintaining complete semantic integrity and token efficiency, generating deep hierarchical tabletrees. Normal-length complex tables can be processed by direct hierarchical ingestion by LLMs. Overlong tables can be processed by LLM-generated scripts (e.g., Python or Pandas) which can be executed externally, creating shallow, structured tabletrees optimizing token efficiency and fidelity.

The document preparation unit 102 comprises a multimodal content integration process 116. In one implementation, the multimodal content integration process 116 creates concise, un-indented textual placeholders from multimodal content (such as images, code snippets, formulas) via specialized LLM prompts. The original multimodal content can be stored, preserving absolute fidelity and enabling optional dynamic reintegration during retrieval.

The document preparation unit 102 comprises a retrieval unit generation process 110. In one implementation, the retrieval unit generation process 110 algorithmically generates specialized retrieval units 112 ("chunksets") that represent specific traversal paths through the input document 104's hierarchical representation 108, combining parent-child relationships across depth levels according to token limits. In one implementation example, a multi-step algorithmic creation process is performed which includes (1) sorting chunks by depth and position, (2) collapsing adjacent chunks at the same depth level within token limits, (3) recursively prepending higher-level parent chunks to form complete traversal paths, and (4) creating chunksets as unique combinations that maintain hierarchical integrity while optimizing token usage. One implementation provides embedding at the chunkset level rather than individual chunk level to enable semantically complete retrieval. The chunksets can be stored with their embeddings in a repository, where each chunkset maintains pointers to its constituent chunks rather than duplicating content. This enables retrieval at semantically meaningful levels that inherently preserve context by matching against chunksets rather than isolated chunks.

In the illustrated embodiment, the processing pipeline 100 also comprises a query processing unit 118 in charge of processing queries 120 relating to the content of the input document 104.

The query processing unit 118 comprises a context document assembly process 122. In one implementation, the context document assembly process 122 dynamically assemblies concise, contextually optimized and minimally redundant context documents ("cheatsheets") from retrieval units 112 (chunksets) per query-input document pair. Optionally, the exact original multimodal elements can be reintegrated based on explicit retrieval criteria such as user preference, precision requirements, token availability, or semantic/visual differences.

The embodiment illustrated in FIG. 1 advantageously combines several unique features of the present disclosure to provide important advantages including:

Explicit utilization of LLMs' inherent incremental hierarchical comprehension through structured verbatim reproduction.
 Lossless iterative processing method for extensive documents.
 Novel dual-method tabular data transformation optimizing both semantic complexity and token efficiency.
 Unified multimodal content handling with external original-content fidelity preservation.
 Innovative hierarchical chunksets enabling mathematically meaningful retrieval combinations.
 Dynamic, query-specific cheatsheet assembly with optional multimodal content reintegration for enhanced retrieval accuracy.

While a complete embodiment that combines various unique features and specific implementations of the present disclosure has been described in connection with FIG. 1, it is noted that various other embodiments may implement only certain subsets of these features or implementations. For example, one embodiment may provide a processing pipeline that includes only the document preparation unit 102, while the query processing unit 118 is part of another processing pipeline, possibly operated by a different entity. Likewise, further processing pipelines are conceivable which provide a document preparation unit 102 which includes only the lossless hierarchical regurgitation process 106, only the multimodal content integration process 116, only the table integration process 114, or sub-combinations of these three processes.

In the following, each of the individual processes and units shown in FIG. 1 will be described in more detail:

Hierarchical Verbatim Outlining of Text

Figure 2:
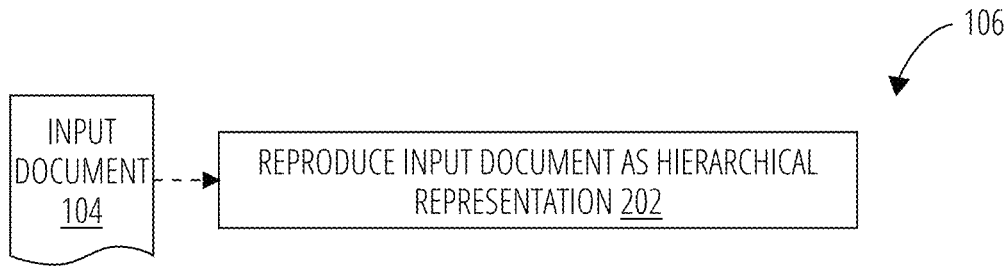
FIG. 2 illustrates a lossless hierarchical regurgitation process in accordance with one embodiment.

FIG. 2 illustrates an embodiment of a lossless hierarchical regurgitation process 106. In step 202, the input document 104 is reproduced as a hierarchical representation 108 ("hierarchical outline"). The hierarchical representation 108 is a version of the input document 104 in which all content items from the input document 104 are preserved verbatim and organized according to the structure of the input document 104.

In one implementation, the hierarchical representation 108 is generated by an LLM. The LLM is explicitly instructed to regurgitate the input document 104 in an indented outline format (e.g., using headings, subheadings, or bullet points to denote the hierarchy) without summarizing or omitting content. Each level of indentation represents a nested section or subsection of the input document 104, effectively chunking the text according to its textual depth level, rather than arbitrary token counts.

The actual full text of each section is included (if a section is too large to include in one LLM answer, the process can continue with elaborately compressed subsequent prompts and/or sections such that nothing is lost). This yields a losslessly chunked hierarchical representation 108, i.e., the entire original input document 104 is "regurgitated" by the LLM in structured pieces that can later be individually retrieved.

For example, a 20-page policy document might be output as a hierarchical representation 108 where top-level entries are its main headings, each followed by indented sub-points containing the exact paragraphs or sentences from the original, preserving wording and even formatting cues (quotes, lists, etc.) as needed. A specific example of an input document 104 is illustrated in FIG. 8, and a specific example of a hierarchical representation 108 is illustrated in FIG. 10, which will be discussed further below.

If the input document 104 exceeds the LLM's output limit, the process can split the task into sequential prompt rounds, e.g., to generate the outline up to a certain point, then continue from there, ensuring continuity of the hierarchical structure across the split.

The prompts can be crafted to maintain structure (e.g.: "Your job is to continue the outline after point X, keeping consistent indentation . . . "). By explicitly leveraging the LLM's ability to follow instructions and copy text, a faithful hierarchical segmentation of the entire input document 104 can be obtained.

In various embodiments, a specialized prompting technique may be used which is engineered to induce the model to output the document in a structured way, rather than free-form text. A generic example of such a prompt is as follows:

You are an assistant that formats text into an outline. Read the following text and reproduce it as a hierarchical outline using indentation (tabs) to show structure. The first line (title) should have no indent. Subpoints: indent one level more. Do not omit any text. Do not summarize.

In various embodiments, the actual prompt may include more rules, but the essence is to explicitly instruct the model to preserve all text and use indentation to denote the document's inherent structure.

During execution, if the document is short enough, a single prompt will yield the fully outlined text. For longer documents, the process can be iterative: The model can be prompted to outline the first part and then continue from a certain delimiter or marker for the next part. The prompts ensure that the second part's outline picks up where the first left off, maintaining consistent indentation levels. This is effectively a form of context window management, where we are breaking the outlining task into chunks that the model can handle, but designing it so that the output is contiguous and complete. The result is an outline that can be as large as needed (spanning multiple LLM outputs if necessary), but logically is one document representation.

This iterative process can also include a hierarchically consistent compression technique, as already explained further above.

The following is a pseudocode example of an exemplary implementation of the iterative process:

```
BEGIN
  Save the full source text for processing.
  Initialize:
    part_number ← 1
    done_parts[ ] ← empty list   // stores raw/full AI-indented parts
    overlong_cycle_done ← False
  WHILE NOT overlong_cycle_done:
    IF part_number = 1 THEN
      compressed ← ""
    ELSE
      raw_joined ← concatenate all elements of done_parts[ ] line by line
      front ← initial front word limit
      back ← initial back word limit
      current_indent_level ← maximum indentation found in raw_joined
      REPEAT
        lines ← split raw_joined into individual lines
        FOR each line with index i:
          IF i is outside the configured edge preservation range:
            IF line contains more than front + back words:
              replace middle with " [...] ", keeping only front and back words
          ELSE:
            keep line unchanged
        IF current_indent_level > 0:
          pruned ← empty list
          FOR each line with index i:
            indent ← indentation of line
            IF i is in edge range OR indent ≠ current_indent_level
              OR i is the first or last line at that level:
              add line to pruned
            ELSE:
              WHILE last line in pruned is "[...]" at same or deeper indent:
                remove last line
              IF no "[...]" already at this level:
                add "[...]" with correct indentation
          lines ← pruned
        compressed ← join all lines with line breaks + delimiter
        current_token_count ← count_tokens(compressed)
        IF current_token_count > target limit:
          Decrease current_indent_level
          Reduce front and back word counts (minimum 3)
      UNTIL current_token_count ≤ target limit OR compression bounds exhausted
    Determine next_text_part such that:
      token count of (compressed + next_text_part) ≤ target limit
    Save next_text_part for reference.
    text_to_indent ← compressed + next_text_part
    Submit text_to_indent to AI for structural indentation.
    Validate and, if necessary, segment the result.
    Append the validated (raw) result to done_parts[ ]
    part_number ← part_number + 1
    IF no further parts remain to be processed:
      overlong_cycle_done ← True
      final_result ← join all elements in done_parts[ ] with line breaks
      IF final_result is empty:
        terminate with error
      Save final_result as the output
END
```

In various embodiments, unlike summarization, every sentence of the original input document 104 appears somewhere in the hierarchical representation 108. Unlike naive chunking, no arbitrary cuts are made, but breaks occur only at natural boundaries (e.g., the end of a section). We call this hierarchical regurgitation because the LLM is effectively spitting back the source text from the input document 104, but in a structured manner.

The structure in the hierarchical representation 108 can follow existing headings in the input document 104 or, in unstructured input documents 104, the LLM's best inference of logical grouping. Even when the LLM has to infer structure (e.g., when the input document 104 has no headings, just paragraphs, or is only a single long line of text), it is instructed in certain embodiments to err on the side of over-segmenting (indent more) rather than under-segmenting. This way, the hierarchical representation 108 captures implicit structure (e.g., a paragraph followed by an indented list in the source would be reflected as such in the outline).

The preferred embodiment discussed here uses indentation (e.g., tabs or spaces) for hierarchy because it is simple and human readable. However, other notations (e.g., XML tags, JSON tree, etc.) could be used to achieve similar results, the concept of hierarchical organization remains the same.

Generative Tabular Data Transformation into "TableTrees"

Figure 3:
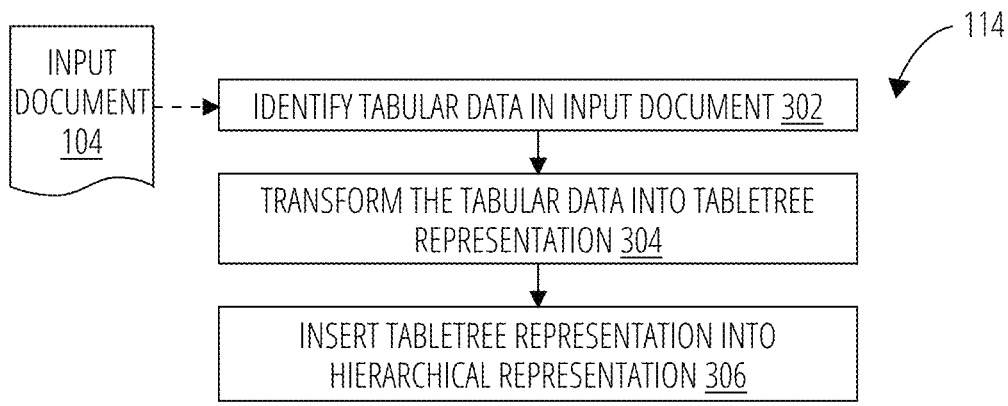
FIG. 3 illustrates a table integration process in accordance with one embodiment.

FIG. 3 illustrates an embodiment of a table integration process 114. For portions of the input document 104 that comprise tabular data (such as spreadsheets, database extracts, etc.), the process provides a way to integrate them into the hierarchical representation 108 without losing their relational structure.

To this end, the process identifies tabular data in the input document 104 in step 302. In step 304, the identified tabular data is transformed into a tabletree representation. A tabletree representation, or "tabletree" in short, is a tree-structured textual representation of the tabular data that preserves all the table's data in a hierarchical list form.

In one implementation referred to as code generation mode, the process prompts an LLM to generate an executable script or code (for example, Python code using a library like Pandas) that transforms the tabular data into the tabletree representation. An exemplary prompt is as follows:

> Write a Python script that reads the following table (provided as CSV) and prints a condensed hierarchical list of its contents, preserving all data.

The script or code, when run, outputs the tabular data as an indented list where, for instance, each row becomes a top-level bullet and each cell in that row is listed under it (e.g., as "ColumnName: value" sub-bullets). Alternatively, each column could be a branch with rows as leaves; the exact structure can be chosen to best reflect the tabular data's logical organization. An exemplary output of an LLM-generated script or code is as follows:

> Row 1:
>     Column A: value1
>     Column B: value2
>     Column C: value3
> Row 2:
>     Column A: value4
>     Column B: value5
>     Column C: value6
> . . .

The key is that the tabletree preserves every data cell in a logical grouping but eliminates superfluous text and compresses the representation to be token-efficient. For example, a 10×10 table could be represented as 10 top-level items (one per row), each with 10 sub-items of "Column: value", which retains all data but in a linearized tree form. If the table originates from a spreadsheet containing formulae, the tabletree can incorporate these formulae for exact reconstruction alongside the resulting cell values.

The generation of the conversion script by the LLM can leverage the LLM's understanding of the tabular data's content and structure, ensuring the format is both faithful and optimized. Using code to perform the transformation guarantees there are no hallucinated values, because the LLM writes a general recipe, and the actual data populating the tabletree representation comes directly from executing the script on the original table. This contrasts with naïve prompting to have the LLM describe the table in prose, which could introduce errors or simply context window overflow in long input tables. An advantage of the code generation mode is that it ensures correctness (the code will literally take each cell value) and efficiency (the LLM does not have to enumerate potentially thousands of cells itself, it delegates to code). Furthermore, this approach guarantees that if the table had a particular value (e.g., a specific number in cell X), that value will appear in the hierarchical representation 108 somewhere under the table's node. Thus, if the user's query later asks about that value, the retrieval system can bring that exact entry to the LLM's context.

In cases of smaller or moderately sized tabular data, an alternative implementation is a so-called direct outline mode, which includes prompting the LLM to directly output the table in an outlined format (essentially having the LLM itself act as the converter), yielding a deep tabletree representation that might include hierarchical grouping for table headers, and the like. An exemplary prompt is as follows:

> The text contains a table. Convert the table to a tree format: each row as an item, each cell as a sub-item. Preserve headers and group data under them. Do not omit any values.

In certain embodiments where the model has vision or table-understanding capabilities, it is even possible to input an image of the table or the CSV for the model to parse. In various embodiments, the direct outline mode results in a deep tabletree, with possibly multiple levels of indentation (e.g., table>section>row>cell).

The process can choose between the direct outline mode (direct LLM conversion) vs. Code generation mode (LLM-generated code) based on the tabular data's size and/or complexity. For a simple table, the LLM can directly list its content in hierarchy; for a very large table that would blow up to an enormous outline, the code approach is used to condense it (e.g., by summarizing repeated patterns or splitting the table into parts).

In various embodiments, support may be provided for tables with colspan and/or rowspan (merged cells). The hierarchical representation 108 or tabletree representation can represent those by repeating the content in each relevant sub-entry or by structuring the hierarchy such that aggregated cells become parents of the values that fall under them. This ensures that complex table structures (such as a table with grouped rows under a category) are represented in a way the LLM can still interpret accurately (e.g., a cell that spans three columns might be represented either as a higher node with three sub-values summing up something—or as repetitive information, a crucial distinction only AI can deliver). The general principle is that the semantics of the table (relationships between cells) are preserved, not just the data.

In various embodiments, tables may be compressed by pruning extremely large ones or splitting them, but only if an alternate representation (like a statistical summary) is also stored. In the truly lossless mode, no pruning is done; the entire table is always present in some textual form.

In various embodiments, the generated tabletree representation, whether produced directly or via code, is then inserted into the overall hierarchical representation 108 at the appropriate position in step 306 (replacing the original table with this textual structure).

As a result, every numeric or text entry from the tabular data is present in the hierarchical representation, ensuring no loss of information.

Multimodal Content Integration

Figure 4:
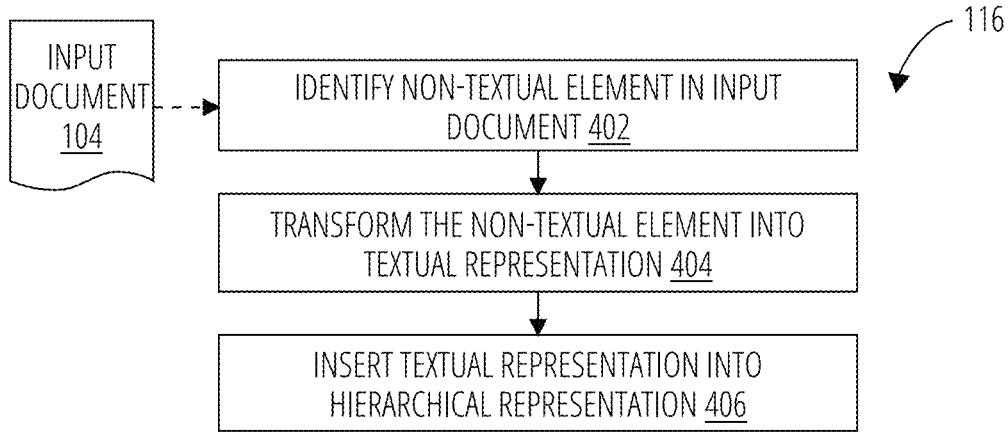
FIG. 4 illustrates a multimodal content integration process in accordance with one embodiment.

FIG. 4 illustrates an embodiment of a multimodal content integration process 116. For portions of the input document 104 that comprise non-textual elements (such as images, charts/graphs, or embedded code snippets) the process provides a way to integrate them into the hierarchical representation 108 without losing their information.

To this end, the process identifies a non-textual element in the input document 104 in step 402. In step 404, the identified non-textual element is transformed into a textual representation. Such a textual representation can be implemented as a placeholder (such as "[Image X: description]") or descriptive node, ensuring it is represented in context. In step 406, the generated textual representation is then inserted into the hierarchical representation 108 at the appropriate position.

In one implementation of step 404, for each non-textual element (e.g., image) encountered, the process invokes an OCR or captioning tool to obtain some descriptive text, which is then passed to a text-only LLM with instructions to include it suitably. In another implementation of step 404, for each non-textual element (e.g., image) encountered, the process invokes an LLM with vision capability or an image-to-text model to produce a concise textual description of the image (and/or extracts any text present in the image, via OCR).

In various embodiments, the resulting description is then placed in the hierarchical representation 108 under an "Image:" node at the appropriate position (with the text un-indented or tagged in a way to indicate that it is a placeholder, not a continuation of normal text content). The description should uniquely identify the image (e.g., "FIG. 2 is a bar chart showing quarterly sales"), which is labeled clearly in the hierarchical representation 108 (e.g., start the line with "Image:" or a special token) so that later, it can be determined that this node corresponds to an image.

The actual non-textual element (e.g., the image file) can be stored separately (and perhaps referenced by filename or an ID in the outline).

Similarly, for a self-contained code snippet as another example of a non-textual element (e.g., a JSON example or pseudo-code block), the process can either include it verbatim in the hierarchical representation 108 (preserving formatting in a code block) or replace it with a placeholder summary (e.g.: "[Code snippet: functionality XYZ]") and store the original code separately.

A similar approach can be used for other media such as audio or video. These types of content could be transcribed (or summarized) into text and included, and the files stored.

The goal is to ensure that when the hierarchical representation 108 is later used as LLM context, the model is at least aware of the content of these non-textual elements in a descriptive form. In effect, the hierarchical representation 108 becomes multimodal: it might contain natural language text, structured representations of tables, and descriptive text for images, figures and the like. Such a multifaceted "cheatsheet" encapsulates the original input document 104 in full fidelity across modalities.

Although effectively becoming multimodal, the hierarchical representation 108 of preferred embodiments holds everything in text form. The benefit is that the hierarchical representation 108 can be treated uniformly during retrieval, e.g., an image's description will be indexed and can be retrieved if relevant to a query. If a user's question might be answered by an image (e.g., "What does the diagram illustrate about the system architecture?"), the system might retrieve the descriptive node for that image. The LLM can use the description to answer, or the system might decide to fetch the actual image (since it has the reference) and either present it to the user or use a vision model to get more detail.

Put differently, embodiments essentially create a textual surrogate for each modality and incorporate it up-front. This can be seen as a form of data augmentation, making images searchable by text. It also futureproofs the knowledge base: if later an advanced multimodal model is available, the stored original images can be utilized, but if only text models are used, we still have a useful representation of that content.

Hierarchical Context Assembly for RAG

Figure 5:
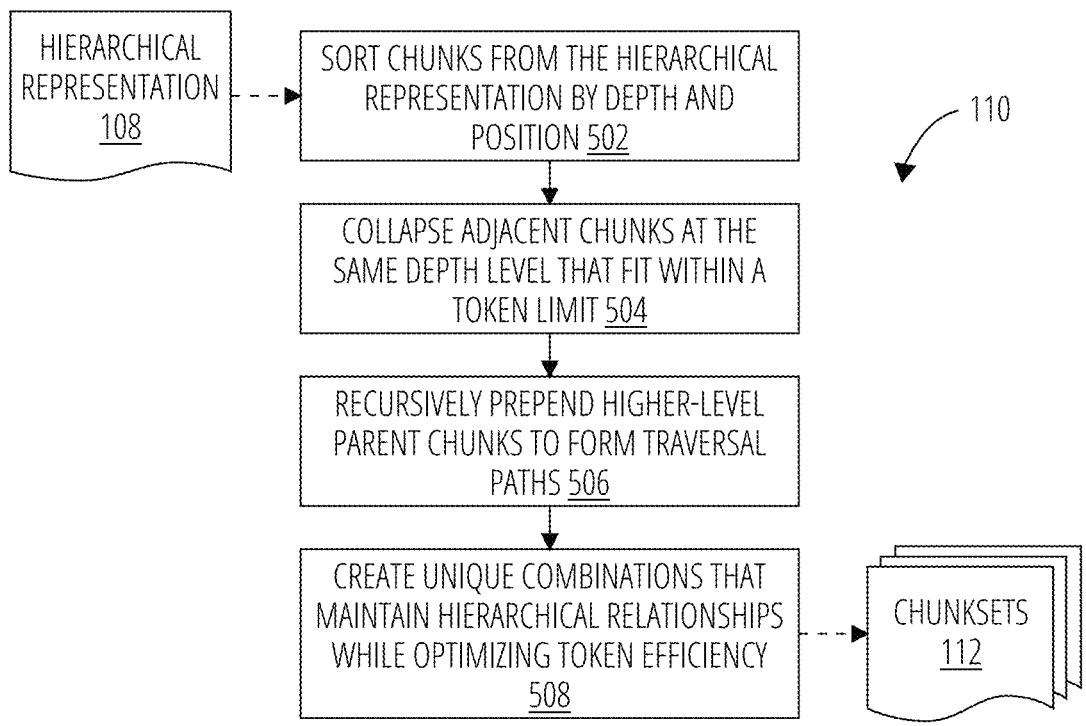
FIG. 5 illustrates a retrieval unit generation process in accordance with one embodiment.

FIG. 5 illustrates an embodiment of a retrieval unit generation process 110. The goal is to process the hierarchical representation 108 to create chunksets, which are specialized retrieval units 112 that capture meaningful traversal paths through the input document 104's hierarchical structure.

Traditional RAG systems typically simply work on individual chunks which would equate to individual nodes in the hierarchical representation 108 such as headings, paragraphs, table entries, and the like. In contrast, certain embodiments of the retrieval unit generation process 110 systematically generate combinations of chunks, so-called chunksets. Each chunkset comprises a combination of chunks that follow parent-child relationships across depth levels. Each chunkset represents a specific traversal path from higher to lower depths in the input document 104 hierarchy. In a chunkset, chunks may be collapsed and/or combined according to token limits. These chunksets, not individual chunks, become the primary units for embedding and retrieval, i.e., the chunksets are vectorized (embedded) and stored in the repository.

The chunkset generation process 110 according to the embodiment illustrated in FIG. 5 begins with parsing the regurgitated text to derive all single textual elements (which constitute the future chunks) including their respective depth (by simply counting the leading tabs/spaces), sorting chunks by depth and position in step 502. In step 504 adjacent chunks at the same depth level that fit within token limits are collapsed. In step 506, higher-level parent chunks are recursively prepended to form complete traversal paths. In step 508, unique combinations that maintain hierarchical integrity while optimizing token usage are created. The resulting chunksets can be stored in a knowledge repository (such as a vector database or text search index) with their embeddings.

In certain embodiments, each chunkset 112 maintains pointers to its constituent chunks rather than duplicating content, creating an efficient retrieval mechanism that preserves the input document 104's hierarchical structure.

Context Document ("Cheatsheet") Assembly & Query Processing

Figure 6:
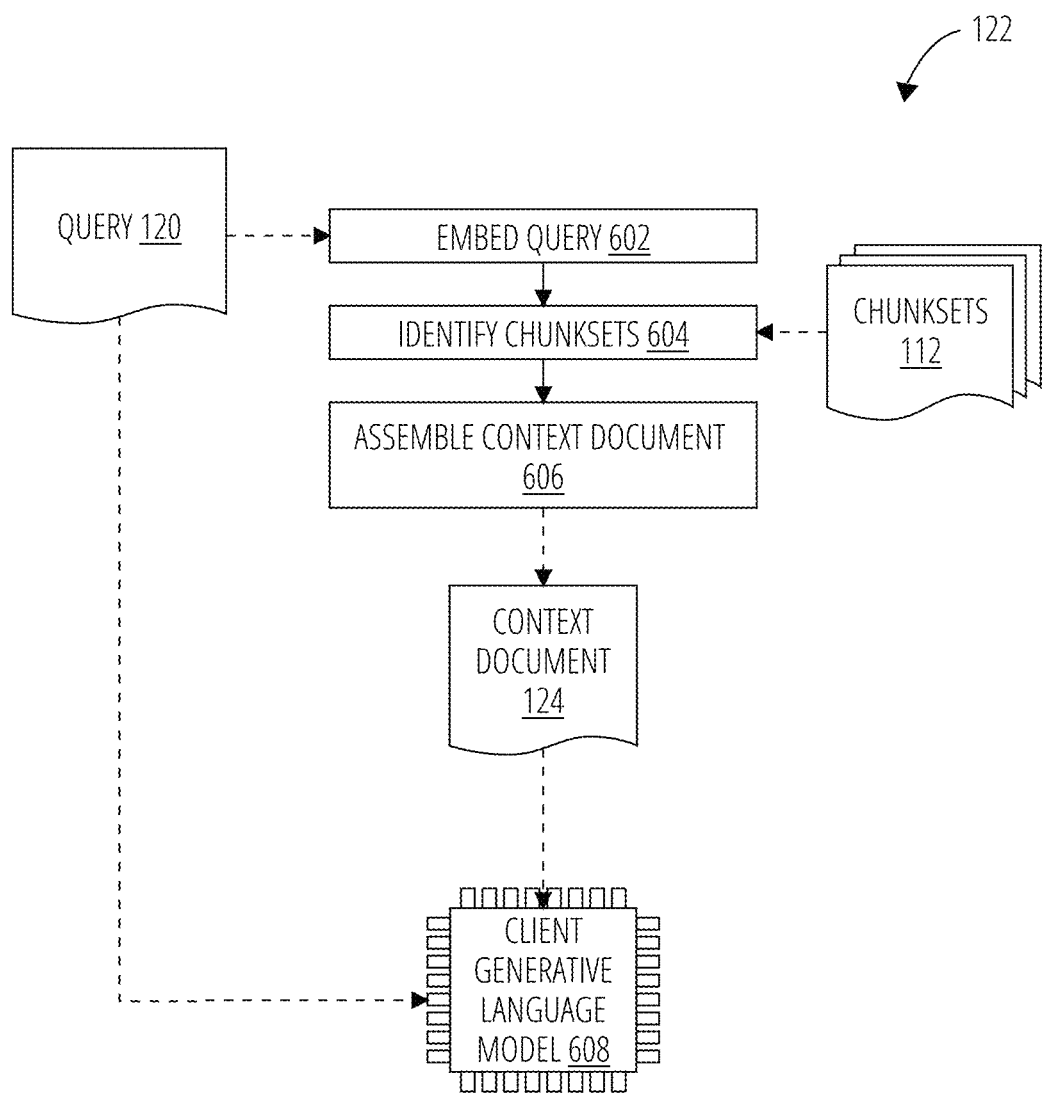
FIG. 6 illustrates a context document assembly process in accordance with one embodiment.

FIG. 6 illustrates an embodiment of a context document assembly process 122.

In various embodiments, when responding to a query 120, the processing pipeline matches against the chunksets 112 rather than isolated chunks. This ensures that retrieval occurs at semantically meaningful levels of the hierarchy. For example, a query 120 might match a chunkset 112 containing both a specific detail and its contextual heading. The pipeline can then extract all chunk IDs from matching chunksets and assemble them into a coherent context document 124 document, a so-called "cheatsheet", for the client generative language model 608, maintaining proper hierarchical relationships.

Since the outline chunks contain verbatim text from the original, the LLM's answer can directly quote exact sentences, improving factual accuracy and enabling precise citation.

The hierarchical representation 108 makes attribution straightforward, as each node in the hierarchy carries an identifier linking back to its source document and section. This allows any LLM-generated answer to be traced to its exact origin.

In the embodiment illustrated in FIG. 6, at query time, the process optionally embeds the query 120 in step 602, evaluates which chunksets 112 best match the query 120 in step 604 (either by matching the query embedding against chunkset embeddings or by matching the raw query text against the textual content of the chunksets), and dynamically assembles the most relevant chunks into a tailored context document 124 (cheatsheet) in step 606. If the total assembled content fits within the LLM's context window, the system may concatenate the chunks in their original structural order. If there are too many, the system may prioritize the most relevant chunks while maintaining hierarchical integrity.

The resulting cheatsheet 124 is an assembled document comprising (or consisting of) precisely those pieces from the original outlines that best answer the query 120. It might include lines like "Section 3: Data Retention Policies—the company shall retain data for X years . . . ", followed by relevant sub-sections or an image description if applicable. This assembled context 124 can then be fed into the LLM (the client generative language model 608) along with the query 120, as shown in FIG. 6. To this end, a prompt template such as the following example can be used:

Using the information provided below, answer the question . . .

This approach ensures that the client generative language model 608 receives precisely the information needed with minimal redundancy while maintaining full hierarchical context. Even when retrieving specific details, their proper context (e.g., parent nodes such as section headings) is automatically included. Because the cheatsheet 124 draws from exact stored outline pieces, it remains faithful to the source input document 104.

The hierarchical representation 108 enables robust source attribution. Each chunk maintains its reference information (such as "[Doc1 § 3.2]"), and the LLM can be instructed to include these references when quoting, enhancing trust and auditability. This retrieval method markedly improves over flat approaches where chunks are arbitrary snippets. Here, chunks are logical segments with their hierarchical context intact.

Optionally, as part of this embodiment, the pipeline can reintegrate original images or other media if the query 120 explicitly requires them and the querying LLM 608 can handle them. This sophisticated retrieval strategy enables efficient querying of even very large knowledge bases, functioning as a dynamic navigation system through a tree of knowledge that extracts precisely the information needed to address the query. When reintegration of the original non-textual elements is desired, for instance, if a query specifically needs the image replaced with a textual description in the hierarchical representation 108, the stored image can be retrieved and passed to a vision-enabled model, or the exact code snippet could be fetched. In certain embodiments, however, the core representation used for retrieval is the textual hierarchical representation 108 with placeholders, as this is what a standard LLM can consume. Notably, because the descriptions are generated via LLM or AI, care is taken that they are accurate (the prompts for image description focus on objective detailing of the image). This unified handling of modalities differs from conventional approaches where each modality is siloed.

In various embodiments, when queries span multiple input document 104, the cheatsheet 124 can include chunks from different hierarchical representations 108, effectively creating an on-the-fly mega-outline specific to the query 120. The shared hierarchical format ensures these diverse sources can be merged coherently. As an added benefit, users can directly request the outline itself (e.g., "Show me the hierarchical summary of Document X"), and the system can return the stored outline (i.e., the hierarchical representation 108) as a human-readable quick reference. This dual use of hierarchical representations, for both AI context assembly and for human reference, adds significant practical value.

Maintenance and Iteration

Over time, source documents may be updated, or new documents will be added to the knowledge base. Various embodiments can also support maintaining and updating the hierarchical representation 108 over time. When an input document 104 changes or new data is added, its hierarchical representation 108 can be regenerated or incrementally updated.

In one example implementation, the hierarchical representation 108 is simply regenerated from scratch when the input document 104 changes.

In another example implementation, a diff on the input document 104 is performed and the LLM is prompted to update the affected outline sections only. Another aspect is extensibility to new data types, for instance, if a new kind of structured data is encountered (e.g., XML or a slide deck), the pipeline could prompt the LLM to generate a new parser or conversion code for that format (similar to how tabular data is handled, as explained further above).

In yet another example implementation, an LLM reads the old input document version, the new input document version, and then describe the differences in an outline form, which could then be applied to update the stored hierarchical representation. Because the hierarchical representation is lossless, it can even be treated as the canonical form and apply edits to it directly, if minor. If the format of data is something not encountered before (e.g., when the system is extended to handle slides or spreadsheets), the pipeline can incorporate new conversion prompts and/or scripts. For example, if a PowerPoint file is input, the system might prompt the LLM to extract text from slides and treat each slide as a section in the outline, maybe with an image placeholder for any diagram.

Embodiments are flexible to handle such cases by leveraging the LLM's ability to follow new instructions.

In various embodiments, hierarchical representations 108 themselves can be composed into larger structures. Multiple input documents 104 can each be converted to a hierarchical representation 108, and then a higher-level outline can organize the collection (e.g., an outline of an entire corpus with one node per input document 104, each linking to the document's own outline tree). This creates a multi-level hierarchy of information (a forest of trees).

IMPLEMENTATION EXAMPLES

Figure 7A:
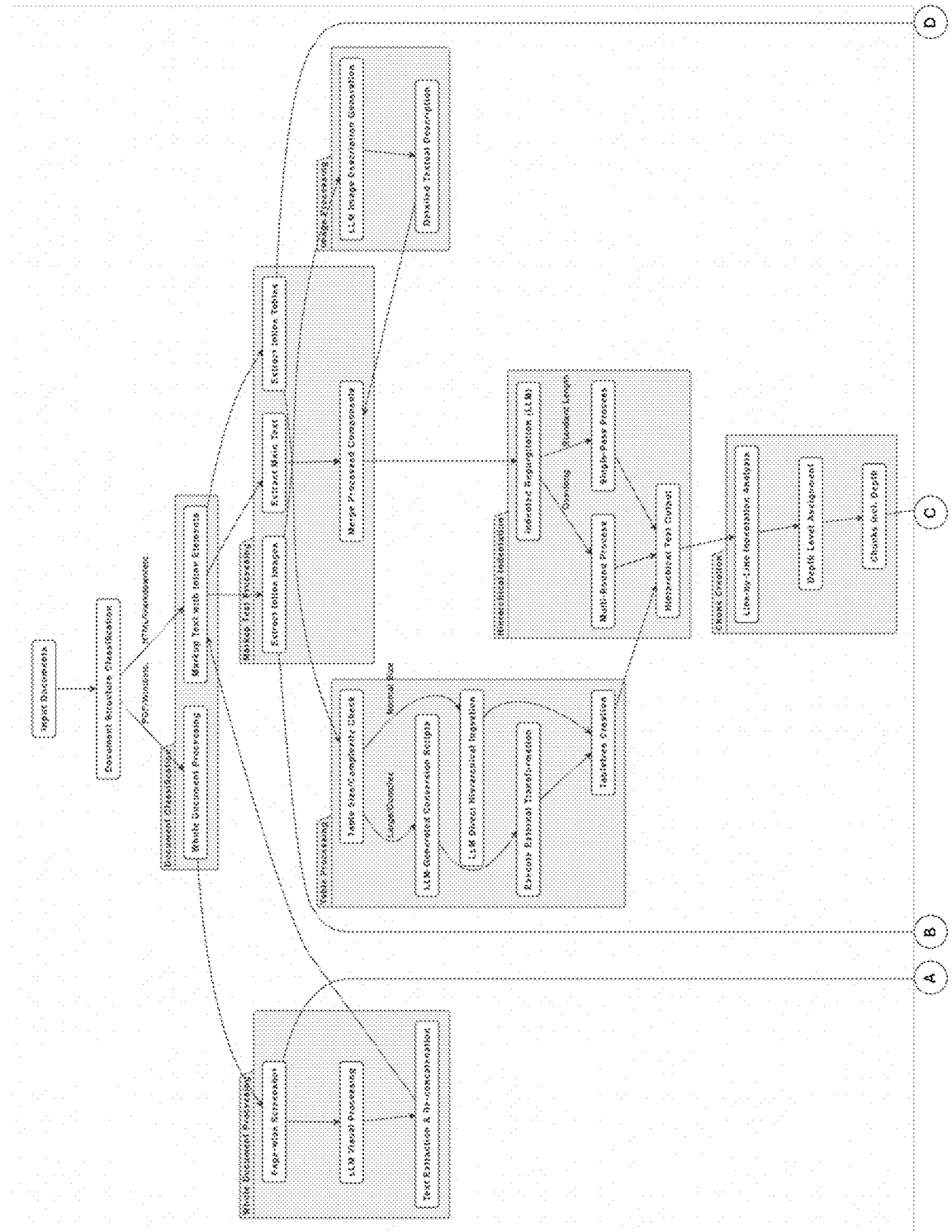
FIG. 7A illustrates a detailed exemplary implementation in accordance with one embodiment.
Figure 7B:
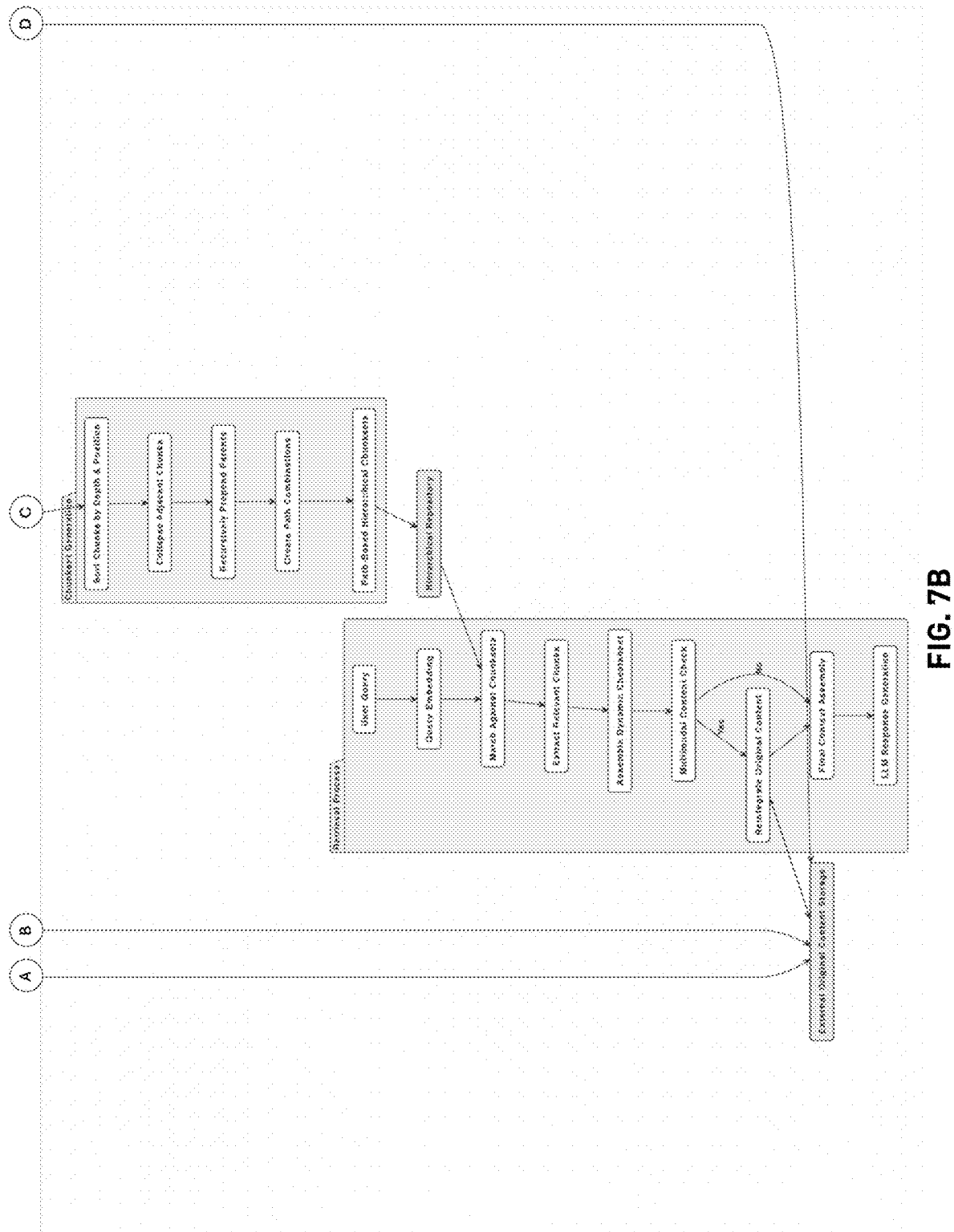
FIG. 7B illustrates a continuation of the detailed exemplary implementation of FIG. 7A.

FIG. 7A and FIG. 7B illustrate a detailed processing process that combines various concepts of the present disclosure in accordance with one exemplary embodiment.

FIG. 8 illustrates an example of an excerpt of an input document 104 according to an embodiment. The full version of the document is available at https://www.bopa.ad/bopa/026067/Pagines/lo26067002.aspx. The input document 104 in this example is a legal text which regulates personalized vehicle registration plates in Andorra. As can be seen, the input document 104 includes various text elements 802 and a table 804 as an example of tabular data.

FIG. 9A to FIG. 9F illustrate chunks created from the input document 104 in FIG. 8 using LlamaCloud, which is a managed platform for data parsing and ingestion using LlamaIndex. To ensure comparability, LlamaCloud was tasked in "auto-mode for accuracy" and let to decide itself how to best handle both ingestion and retrieval for that goal. The goal was to answer the question fully, and for both systems all further results not contributing to the answer (i.e., lower in relevancy ranking than the last one needed) were excluded (it might be noted that the automatic limitation to relevant results was superior in our system, however). Summing up the individual chunk sizes, the LlamaCloud representation uses a total of 1,542 tokens (956+277+124+40+95+50).

FIG. 10 illustrates an excerpt of a hierarchical representation 108 created for the example input document 104 in FIG. 8 according to one embodiment. As can be seen, the text elements 802 from the input document 104 have been structured with indentation levels 1002, and all content of the input document 104 is carried over to the hierarchical representation 108. The table 804 from the input document 104 has been transformed into a tabletree representation 1004.

FIG. 11A to FIG. 11C illustrate three chunksets (retrieval units 112) created for the example input document 104 in FIG. 8 based on the hierarchical representation 108 in FIG. 10 in accordance with one embodiment. Summing up the individual token amounts, this representation uses a total of 616 tokens (144+135+337), which is much less than in the LlamaCloud representation. However, the actual savings are much higher as not these chunksets are provided as context, but the de-duplicated cheatsheet (see below) based on them.

FIG. 12 illustrates the cheatsheet (context document 124) created for the example input document 104 in FIG. 8 in accordance with one embodiment. As can be seen, the cheatsheet 124 uses only 337 tokens, which is much less than in the LlamaCloud representation.

The relation between the consumed input tokens for the client LLM is thus $$1 - \frac{337}{1542} = \sim 78\%.$$

To put this into perspective, 1,542 input tokens in a single call (chat question) to GPT-4.5 currently infer cost of almost 0.12$, whereas the equivalent 337 tokens of the described embodiment result in less than 0.03$. The relationship is directly proportional as well for consumed network bandwidth, and especially energy (for both inference and transmission).

In terms of storage, it should be noted that the approach according to the described embodiment basically only needs to save the original text (i.e., the unavoidable in any case) and a minimum overhead of metadata (the efficiently storable hierarchical relationships and vector embeddings). Note that the LlamaCloud example stored not only a textual representation (chunks of 1,000 tokens text with 200 tokens overlap) and its embeddings, but also a page-by-page rendering of the HTML original and the corresponding OCR, both being in effect redundant.

It is noted that the approach according to the described embodiment might consume slightly more resources during ingestion than the alternatives (not in the case discussed above, but possibly in other cases): Setting aside the conversions necessary in any approach, the approach according to the described embodiment still "regurgitates" the whole content (once), thus potentially inferring higher one-off consumption. However, very cheap, efficient and simple LLMs like gpt-4o-mini can be perfectly fine-tuned to the task of regurgitation, thus greatly reducing this cost.

Actually, even the pre-processing of a query-time document using the described approach to then only feed the relevant parts into a complex and cost/energy-intensive main model is highly likely to result in much lower total consumption.

This effect amplifies when reasoning is involved, thereby requiring the model to read the context in each "round". Such agentic interactions also allow for more time, thus posing a second application besides one-off ingestion into knowledge bases.

In the following, example prompts usable in various embodiments are described:

Example prompt: Regurgitation (including un-indented image descriptions, and tables processed separately and then integrated):
1. Read the whole text from top to bottom.
2. Output a structured version of the input, where you show the structure through indentation (using tabs)

When a sentence/paragraph/item is a continuation of the previous one, it should be indented more to show its dependency—or merged with it if it is short If in doubt, rather indent more than less The very title of the document (most likely the first line—if it doesn't qualify please prepend an appropriate title as the first line) must have the lowest indentation level and must be the only one on it.

Lists and paragraphs behind a colon (":") must be indented more.

Placeholders like "{table_placeholder_example}" must be indented like text (most likely one level more/deeper than their immediate surroundings).

Do not strictly treat each printed/visual original line as one result line, rather concatenate lines that obviously together build one sentence.

Analogously, also ensure that each line carries only one sentence, i.e. all sentences are separated/isolated from each other by \\n.

Remember:
Do not omit any part of the input!
Do not include triple backticks or any surrounding prose/explanation in your answer, just the raw markdown result.

Example prompt: Regurgitation (iterative second and following steps):
1. Read the whole text from top to bottom.
2. Your job is to indent the text after the delimiter '{overlong_delimiter_1}' in a way that seamlessly continues the structure of the part before (which might have been compressed using [ . . . ] ellipses).
3. Output a structured version of the input, where you show the structure through indentation (using tabs).

When a sentence/paragraph/item is a continuation of the previous one, it should be indented more to show its dependency—or merged with it if it is short.

If in doubt, rather indent more than less.

The very title of the document must have the lowest indentation level.

Lists and paragraphs behind a colon (":") must be indented more.

Placeholders like "{table_placeholder_example}" must be indented like text (most likely one level more/deeper than their immediate surroundings).

Do not strictly treat each printed/visual original line as one result line, rather concatenate lines that obviously together build one sentence.

Analogously, also ensure that each line carries only one sentence, i.e. all sentences are separated/isolated from each other by \\n.

Remember:
Do not omit any part of the input!
Do not introduce new [ . . . ] ellipses in the part after the delimiter that you indent now!

Do not omit the delimiter ({overlong_delimiter_2}) in the output, but leave it in the output to mark the new part!

Do not include triple backticks or any surrounding prose/explanation in your answer, just the raw markdown result.

Example prompt: Table2tree:

Derive the hierarchical tree from the table given in the user input, focusing only on the structure and values.

Colspans and rowspans mean aggregation and must be respected (by repeating their cell contents for descriptors, but numerical non-date values should instead appear as their own level of hierarchy as a sum).

Output only the tree (using only indentations, nothing fancy)!

The following is an example of tabular data in HTML format as input for the above Table2tree prompt:

<table><tr><th>University</th><th>Department</th><th>Course</th><th>Students Enrolled</th><th>Total Students</th></tr><tr><td rowspan='4'>State University</td><td rowspan='2'>Engineering</td><td>Computer Science</td><td>120</td><td rowspan='2'>300</td></tr><tr><td>Mechanical Engineering</td><td>180</td></tr><tr><td rowspan='2'>Arts</td><td>History</td><td>150</td><td rowspan='2'>350</td></tr><tr><td>Literature</td><td>200</td></tr></table>

Using the Table2tree prompt above, the resulting tabletree representation is:

State University
    Engineering
        Total Students: 300
            Computer Science: 120 Students
            Mechanical Engineering: 180 Students
    Arts
        Total Students: 350
            History: 150 Students
            Literature: 200 Students Example prompt: Image description (then, main text for regurgitation):

Convert the whole input image to markdown in the detected natural reading order.

If there is no title you detect, please prepend an appropriate one.

Use inline HTML (not markdown) for all tables.

Replace all illustrations/photos/graphs/charts by verbal descriptions what is shown.

Omit page numbers and decorative watermarks as well as any TOC (table of contents) etc., which are redundant information and not needed.

Replace more than three dots (or more than one . . . ) with just . . .

Do not include triple backticks or any surrounding prose/explanation in your answer, just the raw markdown result.

Example prompt: Page screenshot (similar to image):

Convert the whole input (a screenshot of a PDF page) to markdown in the detected natural reading order.

Use inline HTML (not markdown) for all tables.

Replace all illustrations/photos/graphs/charts by verbal descriptions what is shown, prepended by "IMAGE:".

Omit page numbers and decorative watermarks as well as any TOC (table of contents), which are redundant information and not needed.

Replace more than three dots (or more than one . . . ) with just . . .

Do not strictly treat each printed/visual original line as one result line, rather concatenate lines that obviously together build one sentence.

Do not include triple backticks or any surrounding prose/explanation in your answer, just the raw markdown result.

Example prompt: Overlong tables-First prompt:

Analyze this HTML table data structure:
Number of header rows: % d
Header content: % s
First few data rows:
% s
TASK: Determine the table structure and recommend a processing strategy.
ANALYZE:
1. Are there multiple header rows that should be combined?
2. Is the data organized in a pattern where:
   Every two consecutive rows belong together (pairs)?
   Alternate rows follow a pattern (e.g., header/value)?
   Each row is independent (standard table)?
3. Look for patterns in the data that suggest rows should be merged.
4. If the first row of data looks like a header row, indicate this.
RETURN: A JSON object with three properties:
1. "header_rows": The number of header rows (integer)
2. "first_row_is_header": true/false-whether the first row of data appears to be a header
3. "merge_strategy": One of "pairs" (merge every 2 consecutive rows), "alternate" (alternate row pattern), or "none" (standard table)
Example: {"header_rows": 2, "first_row_is_header": false, "merge_strategy": "pairs"}

Example prompt: Overlong tables-second prompt:

Analyze these table records and identify the most appropriate field that should be at the top level of a hierarchical tree structure.

The top-level field should be:
1. A field that logically groups the data (does not need to be unique)
2. Typically the first or last field, but could be any field based on the data semantics
3. The field that would make most sense as a parent node with other fields as children Sample records:
{results_placeholder}
RETURN: A JSON object with these properties:
1. "top_level_field": The name of the field that should be at the top of the hierarchy
2. "is_numeric_aggregation": Boolean indicating if any fields contain numeric values that represent sums/aggregations
3. "aggregation_fields": Array of field names that contain numeric values representing sums/aggregations
Example: {{"top_level_field": "Invoice Number", "is_numeric_aggregation": true, "aggregation_fields": ["Total", "Subtotal"]}}
Please ensure that there are no duplicate column names in your result.

Hardware Implementation

FIG. 13 illustrates a schematic block diagram of computer hardware on which embodiments of the present disclosure can be implemented. As can be seen, a data processing apparatus 1302 comprises one or more processors 1304 and a memory 1306. The one or more processors 1304 are communicatively coupled to the memory 1306. The memory 1306 stores a computer program 1308. The computer program 1308 may implement some or all aspects of the disclosed methods and functionalities.

Advantages & Further Examples

In the following, various advantages achieved by the concepts disclosed herein will be summarized:

By explicitly prompting an LLM to reproduce documents in an outline form (rather than asking it to summarize or answer questions on the fly), every detail is preserved in a way that is segmented and indexed for easy retrieval. All the operations disclosed herein remain lossless in content by design.

By leveraging LLMs to generate transformation code for complex data (like tables), otherwise hard-to-embed information is converted into a form the LLM can digest, without sacrificing fidelity.

By handling text and non-text media uniformly under a hierarchical scheme, it is ensured that no part of the source falls through the cracks.

Even in case summaries or alternate chunksets are additionally created for efficiency, the original full-detail hierarchical representation 108 is preserved as the ground truth reference. By marrying the generative abilities of LLMs with deterministic data transformation, embodiments of the present disclosure create a rich, structured context library for large language models. The LLM is used not to summarize, but to restructure and index information in a way that is congenial to both machines and humans (one could read the hierarchical representation 108 as a comprehensive "cheat sheet" of the source input document 104).

In summary, various embodiments provide an end-to-end pipeline for retrieval-augmented generation that yields responses that are significantly more accurate, contextually relevant, and traceable to the original source. In essence, the disclosed embodiments allow large language models to have a detailed, trustable memory of source materials.

This way, the problem of context window limitations are overcome not by lossy compression, but by intelligent reorganization and expansion of what "context" means (from a flat string of text to a rich, query-dependent structured document). The context-length limitations and hallucination tendencies of LLMs are directly addressed by the disclosed embodiments, in that the model no longer has to internalize huge raw texts or images at query time, and it does not have to guess about data that was pruned or abstracted. Instead, it has the ground truth in bite-sized pieces. The result is optimized retrieval-augmented generation where responses are more accurate, contextually relevant, and traceable to the original materials.

In the following, further exemplary embodiments are disclosed:

Example 1. A method explicitly prompting a generative language model for lossless hierarchical verbatim regurgitation through incremental indentation, exploiting inherent structural comprehension during generation.

Example 2. The method of example 1, comprising iterative multi-round prompting with explicit delimiters for losslessly reconstructing documents exceeding single-output token limits.

Example 3. The method of example 1 or 2, further comprising direct hierarchical ingestion of complex tables, generating deep, semantically faithful "tabletrees."

Example 4. A method comprising prompting a generative language model to create executable transformation scripts for token-efficient shallow hierarchical representation of large tables.

Example 5. A method comprising multimodal placeholder integration within hierarchical structures, maintaining external storage of originals, optionally reintegrating original multimodal content based on explicit retrieval criteria.

Example 6. A method comprising:
Algorithmically generating specialized retrieval units (chunksets) that represent specific traversal paths through the document's hierarchical structure by: (1) sorting chunks by depth and position, (2) collapsing adjacent chunks at the same depth level within token limits, (3) recursively prepending higher-level parent chunks to form complete hierarchical paths, and (4) creating unique combinations that maintain parent-child relationships while optimizing token efficiency.
Embedding and retrieving at the chunkset level rather than individual chunk level, ensuring matches occur against semantically complete paths rather than isolated segments.
Dynamically constructing concise, minimally redundant cheatsheets per query-document pair by extracting and reassembling the constituent chunks from the best-matching chunksets.
Optionally reintegrating original multimodal content based on explicit retrieval criteria, such as user choice, precision requirements, spare context availability, or semantic/visual difference thresholds.

Example 7. A method, comprising:
receiving an input document (104), the input document comprising content items including at least one text element;
performing a lossless hierarchical regurgitation process (106), in which the input document is reproduced as a hierarchical representation (108) in which all text elements from the input document are preserved verbatim and organized according to a structure of the input document.

Example 8. The method of example 7, wherein the lossless hierarchical regurgitation process (106) comprises:
prompting a generative language model to generate the hierarchical representation.

Example 9. The method of example 8, wherein prompting the generative language model comprises:
instructing the generative language model to create the hierarchical representation without summarizing or omitting any of the text elements.

Example 10. The method of any one of examples 7 to 9, wherein the lossless hierarchical regurgitation process is an iterative process; and/or
wherein each iteration comprises generating a partial hierarchical representation until a context window threshold of the generative language model is reached; and/or
wherein each iteration comprises compressing the partial hierarchical representation of the current iteration (and any partial hierarchical representations of previous iterations) horizontally and/or vertically; and/or wherein each iteration comprises concatenating the compressed partial hierarchical representation of the current iteration (and any compressed partial hierarchical representations of previous iterations) with a delimiter followed by the unprocessed remainder of the input document, which serves as input for a subsequent iteration.

Example 11. The method of any one of examples 7 to 10, wherein for a structured input document, the content items are organized in the hierarchical representation according to an explicit structure in the input document.

Example 12. The method of any one of examples 7 to 11, wherein for an unstructured input document, the content items are organized in the hierarchical representation according to an inferred structure of the input document determined by the generative language model.

Example 13. The method of any one of examples 7 to 12, wherein the hierarchical representation uses indentation levels to organize the content items.

Example 14. The method of any one of examples 7 to 12, wherein the hierarchical representation uses semantic labels, such as markup elements and/or markdown elements, to organize the content items.

Example 15. A method, comprising:
receiving an input document (104), the input document comprising content items including at least one text element;
performing a retrieval unit generation process (110), in which retrieval units (112) are generated based on a hierarchical representation (108) of the input document (104) and stored in a repository that is accessible to a client generative language model (608) for retrieval-augmented generation.

Example 16. The method of example 15 combined with any one of examples 7 to 14.

Example 17. The method of examples 15 or 16, wherein the retrieval unit generation process (110) comprises:
generating chunksets as the retrieval units, each chunkset indicating a traversal path through the structure of the input document.

Example 18. The method of example 17, wherein generating chunksets comprises one or more of:
sorting chunks from the hierarchical representation by depth and position;
collapsing adjacent chunks at the same depth level that fit within a token limit;
recursively prepending higher-level parent chunks to form traversal paths; and
creating unique combinations that maintain hierarchical relationships while optimizing token efficiency.

Example 19. The method of examples 17 or 18, wherein each chunkset maintains pointers to its constituent chunks.

Example 20. The method of any one of examples 17 to 19, wherein storing the chunksets as the retrieval units comprises:
computing embeddings for each chunkset and storing the embeddings in the repository.

Example 21. A method, comprising:
receiving an input document (104), the input document comprising content items including at least one text element;
performing a table integration process (114), comprising:
identifying tabular data in the input document; and
transforming the tabular data into a tabletree representation in a hierarchical representation that preserves all data from the tabular data.

Example 22. The method of example 21 combined with any one of examples 7 to 20.

Example 23. The method of example 21 or 22, wherein when the tabular data is below a predetermined size threshold, transforming the tabular data comprises:
prompting a generative language model to transform the tabular data into the tabletree representation.

Example 23. The method of example 21 or 22, wherein when the tabular data exceeds a predetermined size threshold, transforming the tabular data comprises:
prompting a generative language model to generate executable code, or parameters for executable code, that transforms the tabular data into the tabletree representation; and
executing the generated code to produce the tabletree representation.

Example 24. A method, comprising:
receiving an input document (104), the input document comprising content items including at least one text element;
performing a multimodal content integration process (116), comprising:
identifying a non-textual element in the input document; and
integrating a textual representation of the non-textual element into a hierarchical representation.

Example 25. The method of example 24 combined with any one of examples 7 to 23.

Example 26. The method of example 23 or 24, wherein integrating the textual representation comprises:
generating a textual description of the non-textual element;
inserting the textual description in the hierarchical representation at a position corresponding to the non-textual element's location in the input document; and
storing the original non-textual element with a reference identifier linked to its textual description in the hierarchical representation.

Example 27. The method of example 26, wherein generating the textual description comprises one of:
invoking a vision-capable language model to describe an image;
applying optical character recognition to extract text from the image; or
extracting metadata associated with the non-textual element.

Example 28. A method, comprising:
receiving a query;
optionally, embedding the query;
identifying chunksets relevant to the query by comparing the embedded query with stored chunkset embeddings and/or by comparing the query with stored chunksets; and
assembling a context document from chunks referenced by the identified chunksets.

Example 29. The method of example 28 combined with any one of examples 7 to 27.

Example 30. The method of example 28 or 29, wherein assembling the context document comprises:
extracting chunks referenced by the identified chunksets;
maintaining hierarchical relationships between the extracted chunks; and
assembling the extracted chunks into a coherent document while preserving structure information such as indentation.

Example 31. The method of example 29 or 30, wherein when the assembled context document exceeds a context window of the client generative language model, the method further comprises:
  prioritizing chunks based on relevance to the query while maintaining hierarchical integrity.

Example 32. The method of any one of examples 28 to 31, further comprising:
  providing the assembled context document and the query to a client generative language model to generate a response.

Example 33. The method of example 32, wherein each chunk maintains reference information indicating its source location in the input document, and wherein the client generative language model (608) is instructed to include the reference information when quoting from the context document.

Example 34. The method of any one of examples 28 to 33, further comprising, in response to determining that the query requires information from a specific non-textual element:
  retrieving the original non-textual element based on its reference identifier in the hierarchical representation; and
  providing the original non-textual element to the client generative language model (608).

Example 35. A method, comprising:
  detecting an update to an input document;
  identifying portions of a hierarchical representation of the input document affected by the update; and
  selectively regenerating only the affected portions of the hierarchical representation.

Example 36. The method of example 35 combined with any one of examples 7 to 35.

Example 37. A method, comprising:
  creating a multi-document hierarchy by:
    generating a hierarchical representation for each of multiple input documents; and
    creating a higher-level hierarchical representation that organizes the collection of hierarchical representations.

Example 38. The method of example 37 combined with any one of examples 7 to 36.

Example 39. A data processing apparatus, device or system, comprising:
  a processor; and
  a memory storing instructions that, when executed by the processor, configure the apparatus to perform the method of any one of examples 1 to 38.

Example 40. A data processing apparatus, device or system, comprising means for carrying out (the steps of) the method of any one of examples 1 to 38.

Example 41. A computer-readable medium on which computer-executable instructions are stored to implement the method of any one of examples 1 to 38.

Example 42. A computer program (product) comprising instructions which, when the program is executed by a computer, cause the computer to carry out (the steps of) the method of any one of examples 1 to 38.

While various aspects and embodiments have been illustrated and described in detail in the foregoing description and the drawings, such illustration and description is illustrative or exemplary and not restrictive. Variations to the disclosed embodiments can be understood and effected by those skilled in the art in practicing the claimed subject-matter, from a study of the drawings, the disclosure, and the appended claims.

Although some aspects have been described in the context of a product, apparatus, device or system, these aspects also represent a description of the corresponding process, method or use, where a block or component corresponds to a method step or a feature of a method step. Analogously, aspects described in the context of a method step also represent a description of a corresponding block or component or feature of a corresponding product, apparatus, device or system.

The order of execution of the operations in the described embodiments is not essential, unless otherwise specified. That is, the operations may be performed in any order, unless otherwise specified, and embodiments may include additional or fewer operations than those mentioned.

In the claims, the word "comprising" does not exclude other elements or steps, and the indefinite article "a" or "an" does not exclude a plurality. A single entity may fulfill the functions of several entities recited in the claims. The mere fact that certain measures are recited in mutually different dependent claims does not indicate that a combination of these measures cannot be used to advantage. Any reference signs in the claims should not be construed as limiting the scope.

Embodiments of the present disclosure can be implemented in hardware, software, or both. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer-readable.

Embodiments of the present disclosure can be implemented on a computer system. The computer system may be a local computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system may comprise any circuit or combination of circuits.

In one embodiment, the computer system may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system. Some or all of the method steps may be executed by (or using) a hardware apparatus, like for example, a processor, a microprocessor, a programmable computer or an electronic circuit. In some embodiments, some one or more of the described method steps may be executed by such an apparatus. A further embodiment is an apparatus as described herein comprising a processor and a storage medium.

Embodiments of the present disclosure can be implemented as a computer program (product) with a program code, the program code being operative for performing one of the methods when the computer program product runs on a computer. The program code may, for example, be stored on a machine-readable carrier. Other embodiments comprise a computer program for performing one of the methods described herein, stored on a machine-readable carrier. A further embodiment is a computer program having a program code for performing one of the methods described herein, when the computer program runs on a computer. A further embodiment is a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment is a computer having installed thereon the computer program for performing one of the methods described herein, or individual steps thereof.

A further embodiment is a data stream or a sequence of signals representing the computer program for performing one of the methods described herein. The data stream or the sequence of signals may, for example, be configured to be transferred via a data communication connection, for example, via the internet.

A further embodiment is an apparatus or a system configured to transfer (e.g., electronically or optically) a computer program for performing one of the methods described herein to a receiver. The receiver may, for example, comprise a computer, a mobile device, a memory device or the like. The apparatus or system may, for example, comprise a file server for transferring the computer program to the receiver.

REFERENCE SIGNS 100 processing pipeline
102 document preparation unit
104 input document
106 lossless hierarchical regurgitation process
108 hierarchical representation
110 retrieval unit generation process
112 retrieval units
114 table integration process
116 multimodal content integration process
118 query processing unit
120 query
122 context document assembly process
124 context document
202 step
302 step
304 step
306 step
402 step
404 step
406 step
502 step
504 step
506 step
508 step
602 step
604 step
606 step
608 client generative language model
802 text element
804 table
1002 indentation levels
1004 tabletree representation
1302 data processing apparatus
1304 processor
1306 memory
1308 computer program

The invention claimed is:

1. A document preparation method, comprising:
   receiving an input document, the input document comprising content items including at least one text element;
   performing a lossless hierarchical regurgitation process, in which the input document is reproduced as a hierarchical representation in which all text elements from the input document are preserved verbatim and organized according to a structure of the input document, wherein the lossless hierarchical regurgitation process comprises:
   prompting a generative language model to generate the hierarchical representation, wherein the prompting instructs the generative language model to create the hierarchical representation without summarizing or omitting any of the text elements; and
   performing a retrieval unit generation process, in which retrieval units are generated based on the hierarchical representation and stored in a repository that is accessible to a client generative language model for retrieval-augmented generation;
   wherein the lossless hierarchical regurgitation process is an iterative process;
   wherein each iteration comprises generating a partial hierarchical representation until a context window threshold of the generative language model is reached;
   wherein each iteration comprises compressing the partial hierarchical representation of the current iteration and any partial hierarchical representations of previous iterations horizontally and/or vertically;
   wherein each iteration comprises concatenating the compressed partial hierarchical representation of the current iteration and any compressed partial hierarchical representations of previous iterations with a delimiter followed by the unprocessed remainder of the input document, which serves as input for a subsequent iteration.

2. The method of claim 1, wherein for a structured input document, the content items are organized in the hierarchical representation according to an explicit structure in the input document; and
   wherein for an unstructured input document, the content items are organized in the hierarchical representation according to an inferred structure of the input document determined by the generative language model.

3. The method of claim 1, wherein the hierarchical representation uses indentation levels to organize the content items.

4. The method of claim 1, wherein the retrieval unit generation process comprises:
   generating chunksets as the retrieval units;
   wherein each chunkset indicates a traversal path through the structure of the input document;
   wherein each chunkset maintains pointers to the chunkset's constituent chunks.

5. The method of claim 4, wherein generating chunksets comprises:
   sorting chunks from the hierarchical representation by depth and position;
   collapsing adjacent chunks at the same depth level that fit within a token limit;
   recursively prepending higher-level parent chunks to form traversal paths; and
   creating unique combinations that maintain hierarchical relationships while optimizing token efficiency.

6. The method of claim 1, comprising a table integration process, comprising:
   identifying tabular data in the input document; and
   transforming the tabular data into a tabletree representation in the hierarchical representation that preserves all data from the tabular data.

7. The method of claim 6, wherein when the tabular data is below a predetermined size threshold, transforming the tabular data comprises:
   prompting a generative language model to transform the tabular data into the tabletree representation; and
   wherein when the tabular data exceeds a predetermined size threshold, transforming the tabular data comprises:
   prompting a generative language model to generate executable code, or parameters for executable code, that transforms the tabular data into the tabletree representation; and
   executing the generated code to produce the tabletree representation.

8. The method of claim 1, comprising a multimodal content integration process, comprising:
   identifying a non-textual element in the input document; and
   integrating a textual representation of the non-textual element into the hierarchical representation.

9. The method of claim 8, wherein integrating the textual representation comprises one or more of:
   generating a textual description of the non-textual element;
   inserting the textual description in the hierarchical representation at a position corresponding to the non-textual element's location in the input document; and
   storing the original non-textual element with a reference identifier linked to the original non-textual element's textual description in the hierarchical representation.

10. The method of claim 9, wherein generating the textual description comprises one or more of:
    invoking a vision-capable language model to describe an image;
    applying optical character recognition to extract text from the image;
    extracting metadata associated with the non-textual element.

11. The method of claim 1, further comprising:
    receiving a query;
    optionally, embedding the query;
    identifying chunksets relevant to the query by comparing the embedded query with stored chunkset embeddings and/or by comparing the query with stored chunksets;
    assembling a context document from chunks referenced by the identified chunksets;
    providing the assembled context document and the query to the client generative language model to generate a response.

12. The method of claim 11, wherein each chunk maintains reference information indicating the chunk's source location in the input document, and wherein the client generative language model is instructed to include the reference information when quoting from the context document.

13. The method of claim 11, further comprising, in response to determining that the query requires information from a specific non-textual element:
    retrieving the original non-textual element based on the original non-textual element's reference identifier in the hierarchical representation; and
    providing the original non-textual element to the client generative language model (608).

14. The method of claim 1, comprising:
    detecting an update to the input document;
    identifying portions of the hierarchical representation affected by the update; and
    selectively regenerating only the affected portions of the hierarchical representation.

15. The method of claim 1, further comprising creating a multi-document hierarchy by:
    generating a hierarchical representation for each of multiple input documents; and
    creating a higher-level hierarchical representation that organizes the collection of hierarchical representations.

16. A data processing apparatus comprising:
    a processor; and
    a memory storing instructions that, when executed by the processor, configure the apparatus to perform:
    receiving an input document, the input document comprising content items including at least one text element;
    performing a lossless hierarchical regurgitation process, in which the input document is reproduced as a hierarchical representation in which all text elements from the input document are preserved verbatim and organized according to a structure of the input document, wherein the lossless hierarchical regurgitation process comprises:
    prompting a generative language model to generate the hierarchical representation, wherein the prompting instructs the generative language model to create the hierarchical representation without summarizing or omitting any of the text elements; and
    performing a retrieval unit generation process, in which retrieval units are generated based on the hierarchical representation and stored in a repository that is accessible to a client generative language model for retrieval-augmented generation;
    wherein the lossless hierarchical regurgitation process is an iterative process;
    wherein each iteration comprises generating a partial hierarchical representation until a context window threshold of the generative language model is reached;

wherein each iteration comprises compressing the partial hierarchical representation of the current iteration and any partial hierarchical representations of previous iterations horizontally and/or vertically;

wherein each iteration comprises concatenating the compressed partial hierarchical representation of the current iteration and any compressed partial hierarchical representations of previous iterations with a delimiter followed by the unprocessed remainder of the input document, which serves as input for a subsequent iteration.

17. A non-transitory computer-readable medium on which computer-executable instructions are stored to implement a method comprising:

receiving an input document, the input document comprising content items including at least one text element;

performing a lossless hierarchical regurgitation process, in which the input document is reproduced as a hierarchical representation in which all text elements from the input document are preserved verbatim and organized according to a structure of the input document, wherein the lossless hierarchical regurgitation process comprises:

prompting a generative language model to generate the hierarchical representation, wherein the prompting instructs the generative language model to create the hierarchical representation without summarizing or omitting any of the text elements; and performing a retrieval unit generation process, in which retrieval units are generated based on the hierarchical representation and stored in a repository that is accessible to a client generative language model for retrieval-augmented generation;

wherein the lossless hierarchical regurgitation process is an iterative process;

wherein each iteration comprises generating a partial hierarchical representation until a context window threshold of the generative language model is reached;

wherein each iteration comprises compressing the partial hierarchical representation of the current iteration and any partial hierarchical representations of previous iterations horizontally and/or vertically;

wherein each iteration comprises concatenating the compressed partial hierarchical representation of the current iteration and any compressed partial hierarchical representations of previous iterations with a delimiter followed by the unprocessed remainder of the input document, which serves as input for a subsequent iteration.

\* \* \* \* \*